(12) United States Patent
Miki et al.

(10) Patent No.: US 7,243,843 B2
(45) Date of Patent: Jul. 17, 2007

(54) PERSONAL AUTHENTICATION MEDIUM ISSUING METHOD

(75) Inventors: Takeo Miki, Machida (JP); Kenji Miyazaki, Komae (JP); Takashi Yamaguchi, Kawasaki (JP); Shinya Tokuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 207 days.

(21) Appl. No.: 10/995,540

(22) Filed: Nov. 24, 2004

(65) Prior Publication Data

US 2005/0116029 A1 Jun. 2, 2005

(30) Foreign Application Priority Data

Nov. 28, 2003 (JP) ............................. 2003-399896
Nov. 19, 2004 (JP) ............................. 2004-335784

(51) Int. Cl.
*G06K 5/00* (2006.01)

(52) U.S. Cl. ........................... 235/382; 235/381

(58) Field of Classification Search ................ 235/382, 235/382.5, 375, 381, 383, 449, 493, 492
See application file for complete search history.

(56) References Cited

U.S. PATENT DOCUMENTS

| | | | | |
|---|---|---|---|---|
| 6,608,911 | B2* | 8/2003 | Lofgren et al. | 382/100 |
| 7,111,168 | B2* | 9/2006 | Lofgren et al. | 713/176 |
| 2002/0080994 | A1* | 6/2002 | Lofgren et al. | 382/100 |
| 2003/0210805 | A1* | 11/2003 | Lofgren et al. | 382/100 |
| 2004/0128512 | A1* | 7/2004 | Sharma et al. | 713/176 |
| 2005/0063027 | A1* | 3/2005 | Durst et al. | 359/2 |
| 2005/0094848 | A1* | 5/2005 | Carr et al. | 382/100 |
| 2005/0247794 | A1* | 11/2005 | Jones et al. | 235/487 |
| 2006/0039581 | A1* | 2/2006 | Decker et al. | 382/100 |

FOREIGN PATENT DOCUMENTS

| | | |
|---|---|---|
| EP | 0 961 239 A2 | 12/1999 |
| JP | 9-248935 | 9/1997 |
| JP | 2000-287066 | 10/2000 |
| WO | WO 99/13391 | 3/1999 |
| WO | WO 02/09019 A2 | 1/2002 |

OTHER PUBLICATIONS

Japanese Office Action dated Aug. 25, 2006 for Appln. No. 2004100958962.
European Search Report dated Dec. 8, 2006 for Appln. No. 04028030.7-2218.

* cited by examiner

*Primary Examiner*—Thien M. Le
(74) *Attorney, Agent, or Firm*—Pillsbury Winthrop Shaw Pittman, LLP

(57) ABSTRACT

In a personal authentication medium issuing apparatus, a main image information is input and whether a personal authentication medium on which synthesized image information having sub-information embedded in the main image information is checked or not is determined based on the state of the input main image information. Further, synthesized image information having sub-information embedded in an invisible state in the main image information which is set in a visible state is formed, a personal authentication medium is formed by printing the synthesized image information on a recording medium and the thus formed personal authentication media are sorted into personal authentication media determined to be completely formed and personal authentication media determined to require a checking process.

33 Claims, 12 Drawing Sheets

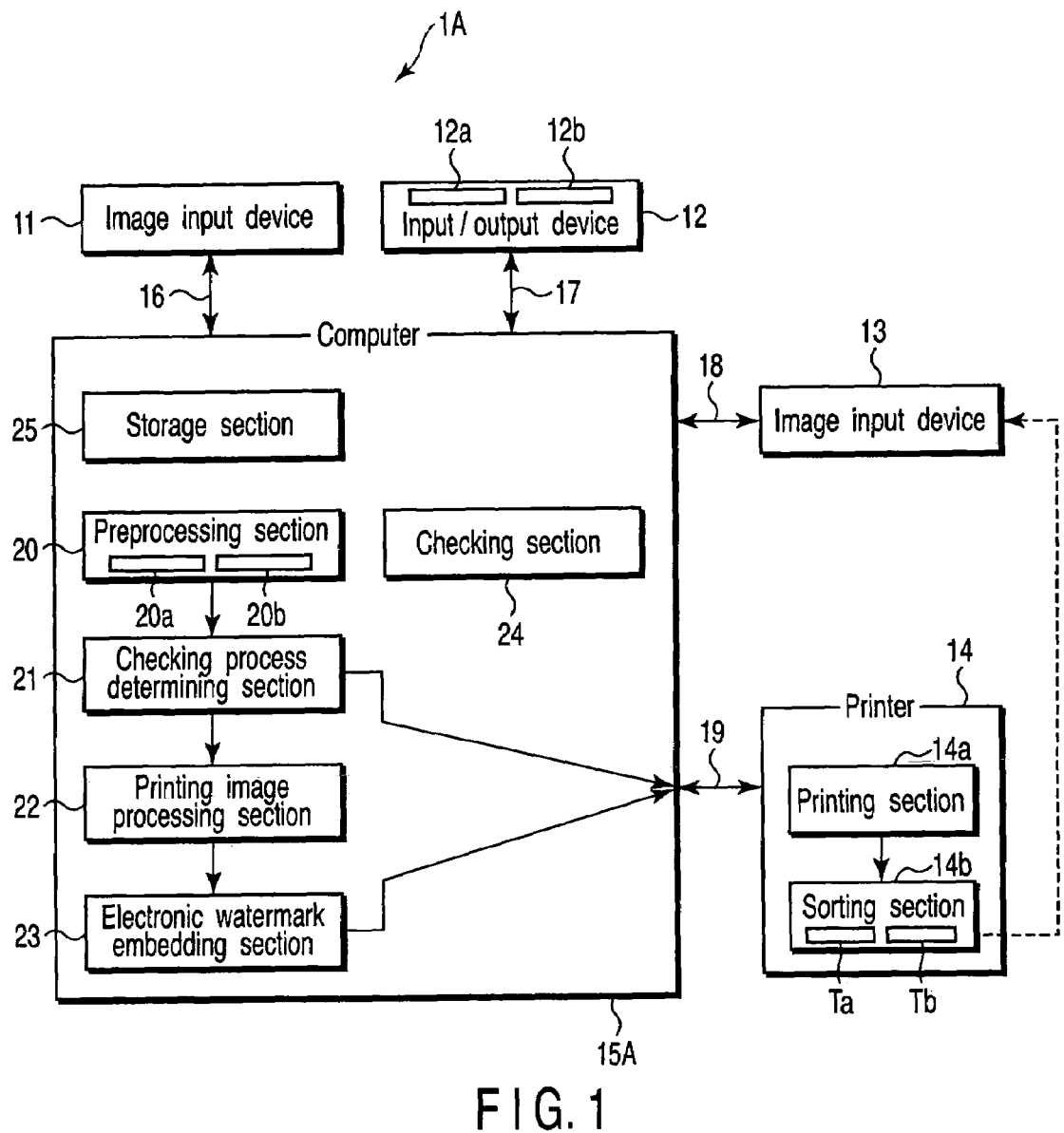
F I G. 1

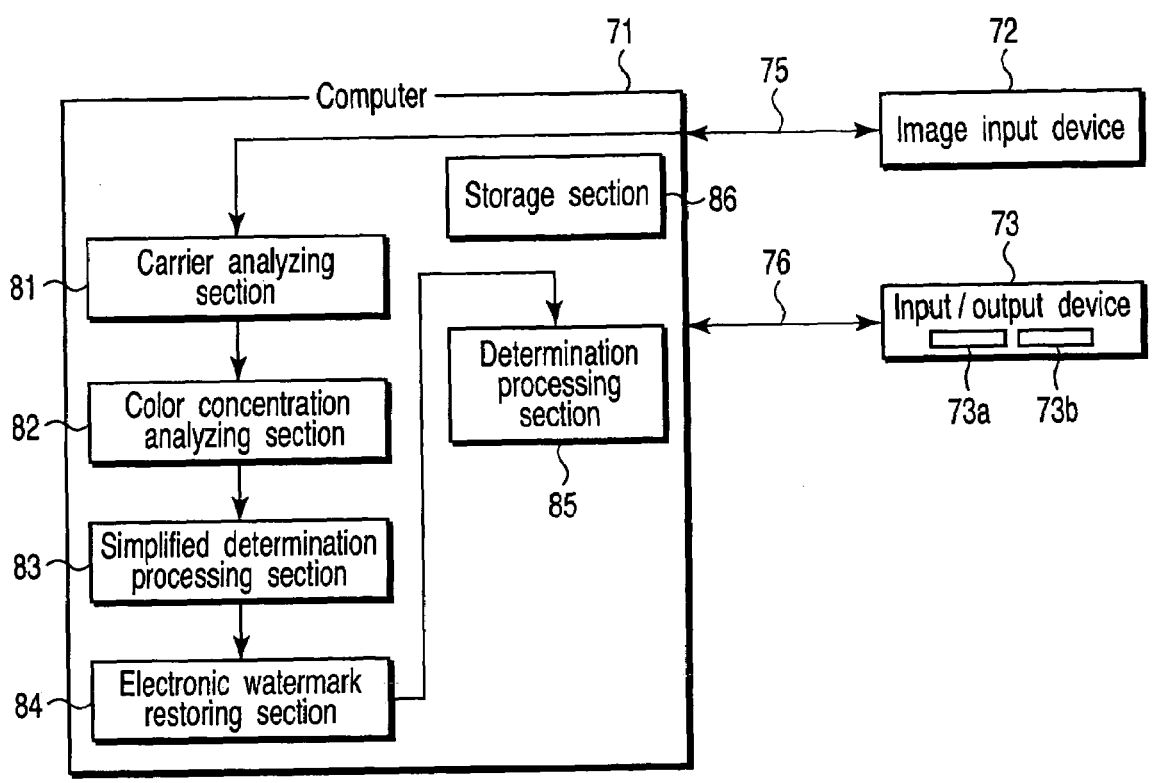
F I G. 14

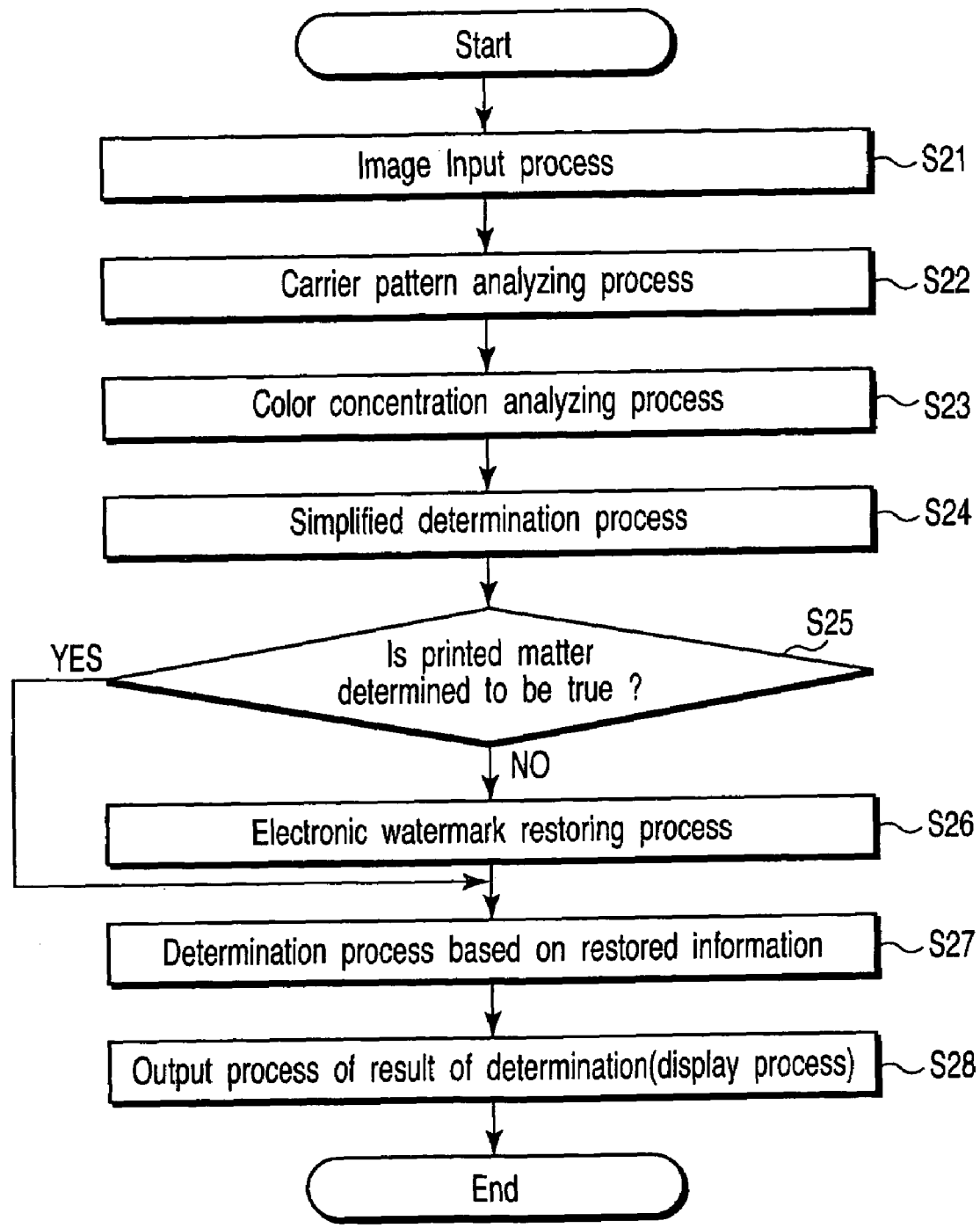
F I G. 15

PERSONAL AUTHENTICATION MEDIUM ISSUING METHOD

CROSS-REFERENCE TO RELATED APPLICATIONS

This application is based upon and claims the benefit of priority from prior Japanese Patent Applications No. 2003-399896, filed Nov. 28, 2003; and No. 2004-335784, filed Nov. 19, 2004, the entire contents of both of which are incorporated herein by reference.

BACKGROUND OF THE INVENTION

1. Field of the Invention

This invention relates to a personal authentication medium issuing apparatus and personal authentication medium issuing method which record synthesized image information formed by embedding and synthesizing additional sub-information (such as security information) set in an invisible state into main image information (such as a face image of a human being) and issue a personal authentication medium, printed matter, and truth determination apparatus and truth determination method which determine the truth or not of the printed matter.

2. Description of the Related Art

In recent years, greater importance is attached to the technique for making an electronic watermark or electronic signature in order to prevent forgery or falsification of an image as information is more electronized and the Internet is more widely used. Particularly, the electronic watermark technique for embedding additional sub-information (sub-image information) in an invisible state into main image information is proposed to take a countermeasure against illicit copying, forgery or falsification of a personal authentication medium such as an IC card or a photograph of having copyright information embedded therein.

For example, an electronic watermark inserting method is known which embeds data into image data output to a printing matter by use of the characteristic of a color-difference component or high spatial frequency which is difficult to be sensed by a human being. Further, an electronic watermark printing apparatus which can confirm an electronic watermark by use of an optical filter is known.

In the conventional electronic watermark embedding process, sub-information is embedded into main image information in an invisible state by use of the following characteristics (1), (2) and (3).

(1) The visual characteristic of a human being is utilized.

In this case, as the visual characteristic of a human being, it is utilized that the gradation identification ability is lowered with an increase in the frequency of an image and it is more difficult to determine color-difference information than luminance information.

(2) The relation of complementary colors is utilized.

For example, red and cyan (=green+blue) are set in the relation of complementary colors in the case of an additive color mixture. Therefore, when red is adjacent to cyan, it is impossible to individually discriminate the colors to the human eyes and they can be seen as an achromatic color.

(3) The relation of complementary colors and color-difference information are applied to a high frequency carrier pattern image.

For example, when a block (high frequency carrier pattern image) in which red-rich images and cyan-rich images are repeatedly arranged is observed by human eyes, the color-difference amount is determined (visually recognized) as ±0 (that is, as an achromatic color). This is because a small difference in the color difference cannot be recognized by the human eyes.

The truth determination of a printed matter having an image recorded thereon (an image which has sub-information embedded in main image information) to which the above electronic watermark technique is applied is made by checking whether the sub-information obtained by a sub-information restoring process is correct or not. By performing the restoring process by use of key information, the sub-information recorded in an invisible state is restored and the truth determination is made.

However, in the electronic watermark technique utilizing the color difference, the stability (of restoration) of sub-information may vary depending on a color of the main image information in some cases. For example, when a face image is used as the main image, the image quality of a black portion such as hairs is degraded and the stability of the sub-information is degraded in some cases. Also, when sub-information is embedded by use of the same color-difference amount as that of the face portion of a skin color, the stability of the sub-information is degraded in some cases. In a printed matter such as a personal authentication medium, in order to make stable and correct truth determination, it is necessary to set a state in which sub-information embedded in the main image information can be correctly restored. Therefore, conventionally, in the issuing process of a printed matter such as a personal authentication medium, it is necessary to check whether or not the sub-information can be correctly restored from the entire personal authentication medium formed. The above operation takes an extremely long time and may cause the issuing efficiency of the printed matters such as the personal authentication media to be extremely lowered.

BRIEF SUMMARY OF THE INVENTION

Accordingly, an object of this invention is to provide a personal authentication medium issuing apparatus and personal authentication medium issuing method which can minimize the time and labor required for checking a personal authentication medium and enhance the issuing efficiency of personal authentication media.

Further, another object of this invention is to provide a printed matter which can be efficiently issued and efficiently determined to be true or not.

In addition, an object of this invention is to provide a truth determination apparatus and truth determination method which can efficiently determine the truth or not of a printed matter.

A personal authentication medium issuing apparatus according to an aspect of the present invention which issues personal authentication media comprises an image inputting device which inputs main image information, a determining section which determines whether or not a personal authentication medium issued by use of the main image information is checked based on the main image information input from the image input device, an electronic watermark embedding section which embeds sub-information set in an invisible state to naked eyes of a human being in main image information input from the image input device to form synthesized image information, a forming section which forms a personal authentication medium by printing synthesized image information formed by the electronic watermark embedding section on a recording medium, and a sorting section which selectively sorts personal authentication media formed by the forming section into personal authentication media determined to be completely formed and personal authentication media determined to require a checking process.

A personal authentication medium issuing apparatus according to another aspect of the present invention which issues personal authentication media comprises an image inputting device which inputs main image information, a determining section which determines whether or not a gradation correction process is required for the main image information input from the image input device, a preprocessing section which performs a preprocessing process containing the gradation correction process for the main image information which is determined to require the gradation correction process by the determining section and performs a preprocessing process containing no gradation correction process for the main image information which is determined not to require the gradation correction process by the determining section, an electronic watermark embedding section which embeds sub-information set in an invisible state to naked eyes of a human being with respect to main image information preprocessed by the preprocessing section to form synthesized image information, and a forming section which forms a personal authentication medium by printing synthesized image information formed by the electronic watermark embedding section on a recording medium.

A personal authentication medium issuing method according to an aspect of the present invention which issues personal authentication media comprises inputting main image information, determining whether or not a personal authentication medium formed by use of the main image information is checked based on the input main image information, embedding sub-information set in an invisible state to naked eyes of a human being with respect to the input main image information to form synthesized image information, forming a personal authentication medium by printing the thus formed synthesized image information on a recording medium, and selectively sorting the thus formed personal authentication media into personal authentication media determined to be completely formed and personal authentication media determined to require a checking process.

A personal authentication medium issuing method according to still another aspect of the present invention which issues personal authentication media comprises inputting main image information, determining whether or not a gradation correction process is required for the input main image information, performing a preprocessing process containing the gradation correction process for the main image information which is determined to require the gradation correction process by the above determining step and performing a preprocessing process containing no gradation correction process for the main image information which is determined not to require the gradation correction process by the above determining step, embedding sub-information set in an invisible state to naked eyes of a human being with respect to the main image information subjected to the preprocessing process to form synthesized image information, and forming a personal authentication medium by printing the thus formed synthesized image information on a recording medium.

A printed matter according to an aspect of the present invention on which synthesized image information having sub-information embedded in main image information is printed comprises carrier patterns each formed of a plurality of print pixels having color components set in a complementary relation to make pairs in an area of the synthesized image information in which the sub-information is embedded, wherein carrier patterns of a number not larger than a preset number which are each formed of a plurality of print pixels having concentration values which lie outside a preset range.

A truth determination apparatus for a printed matter according to still another aspect of the present invention which determines the truth or not of a printed matter comprises an image reading device which reads an image of a printing surface of a printed matter, a first analyzing section which detects a carrier pattern formed of print pixels in which color components set in a complementary relation make pair from an image of an area in which sub-information is embedded in the image of the printing surface read by the image reading device, a second analyzing section which detects a block formed of a plurality of print pixels having concentration values which lie outside a preset range from the image of the area in which the sub-information is embedded in the image of the printing surface read by the image reading device, and a truth determining section which determines that a printed matter in which a carrier pattern is detected by the first analyzing section and the number of blocks detected by the second analyzing section and having concentration values which lie outside the preset range is smaller than a preset number is true.

A truth determination method for a printed matter according to another aspect of the present invention which determines the truth or not of a printed matter comprises reading an image of a printing surface of a printed matter, detecting a carrier pattern formed of print pixels in which color components set in a complementary relation make pair from an image of an area in which sub-information is embedded in the read image of the printing surface, detecting a block formed of a plurality of print pixels having concentration values which lie outside a preset range from the image of the area in which the sub-information is embedded in the read image of the printing surface, and determining that a printed matter in which the carrier pattern is detected and the number of detected blocks having concentration values which lie outside a preset range is smaller than a preset number is true.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically showing the configuration of a personal authentication medium issuing apparatus according to a first embodiment of this invention;

FIG. 14 is a block diagram schematically showing an example of the configuration of a truth determination apparatus for a printed matter according to a fifth embodiment of this invention; and FIG. 15 is a flowchart for illustrating the flow of the process of the truth determination apparatus according to the fifth embodiment.

DETAILED DESCRIPTION OF THE INVENTION

Figure 2:
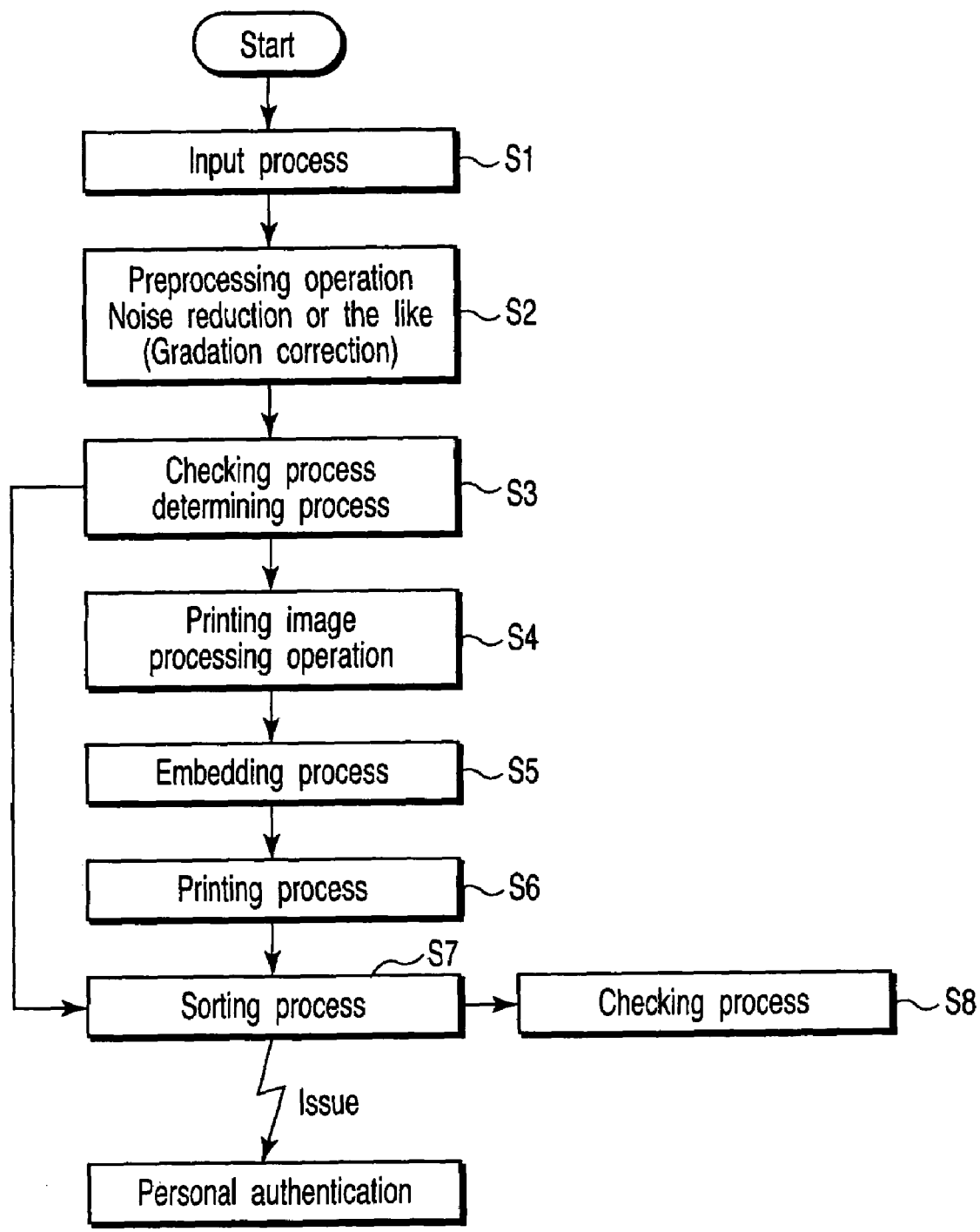
FIG. 2 is a flowchart for illustrating the flow of the process of the personal authentication medium issuing apparatus according to the first embodiment.

There will now be described embodiments of this invention with reference to the accompanying drawings.

First, a first embodiment of this invention is explained.

FIG. 1 schematically shows the configuration of a personal authentication medium issuing apparatus 1A according to the first embodiment. The personal authentication medium issuing apparatus 1A includes an image input device 11, input/output device 12, image input device 13, printer 14, computer 15A and bidirectional communicating sections 16, 17, 18, 19.

The image input device 11 functions as image input means for inputting main image information of a face image, for example. The image input device 11 inputs a face image used as main image information as digital image information of R (red), G (green) and B (blue) in the personal authentication medium issuing process. Further, the image input device 11 is configured by a camera, video camera or flatbed scanner, for example.

The input/output device 12 includes an operating section 12a and display section 12b. The operating section 12a is configured by a keyboard and the like. The operating section 12a is operated by an operator to input personal management information (for example, ID number, name, date of birth, address, period of validity and the like). The display section 12b is configured by a display and the like. The display section 12b is used to display various information items such as operation guidance.

The image input device 13 reads an image of the printing surface of a personal authentication medium. The image input device 13 functions as image input means for reading image information such as synthesized image information printed on the personal authentication medium. The image input device 13 optically reads synthesized image information recorded on the personal authenticate medium and converts the same into digital image information in the personal authenticate medium checking process. The image input device 13 is configured by a flatbed scanner, digital camera or the like. In this example, a case wherein a line scanner having the optical resolution of 1200 dpi and reading resolution of 1200 dpi, for example, is used as the image input device 13 is explained.

The printer 14 includes a printing section 14a and sorting section 14b. The printing section 14a functions as forming means for forming a personal authenticate medium. The printing section 14a is used to print (record) synthesized image information having sub-information embedded in an invisible state in main image information (face image) and character information such as personal management information on a recording medium.

The sorting section 14b functions as sorting means for sorting a personal authenticate medium formed (printed) by the printing section 14a. The sorting section 14b includes an issuing tray Ta which accumulates personal authenticate media formed by the printing section 14a as to-be-issued personal authenticate media and a checking tray Tb which accumulates personal authenticate media formed by the printing section 14a as to-be-checked personal authenticate media. The sorting section 14b sorts issued personal authenticate media and selectively accumulates the personal authenticate media onto the issuing tray Ta or checking tray Tb according to a signal from the computer 15.

The computer 15A includes a preprocessing section 20, checking process determining section 21, printing image processing section 22, electronic watermark embedding section 23, checking section 24, storage section 25 and the like. For example, the computer 15A may be configured by a personal computer (which is hereinafter simply referred to as a PC) or a dedicated board having a CPU, semiconductor memory, hard disk device, image capture board and the like formed thereon. A case wherein the computer 15A is configured by a PC is explained below. When a PC is used as the computer 15A, the preprocessing section 20, checking process determining section 21, printing image processing section 22, electronic watermark embedding section 23 and checking section 24 are configured by part of an application program executed by the PC.

The preprocessing section 20 functions as preprocessing means. The preprocessing section 20 performs a preset preprocessing process for a face image as a main image input via the image input device 11. The preprocessing section 20 includes a first image processing section 20a and second image processing section 20b. The first image processing section 20a performs a noise reduction process, high frequency emphasis process and brightness correction process as a normal image processing operation for a face image (main image). The second image processing section 20b performs a gradation correction process as an image processing operation (for example, an image processing operation performed when a personal authentication medium is re-formed (re-issued)) performed for a special face image (main image).

The checking process determining section 21 functions as first determining means for determining whether a personal authentication medium is checked or not. The checking process determining section 21 determines whether a personal authentication medium issued by use of main image information is checked or not based on the main image information preprocessed by the preprocessing section 20.

The printing image processing section 22 functions as image processing means. The printing image processing section 22 performs a printing image processing operation such as a color conversion process for main image information preprocessed by the preprocessing section 20. The electronic watermark embedding section 23 functions as electronic watermark embedding means. The electronic watermark embedding section 23 embeds sub-information in an invisible state to naked eyes of a human being in main image information processed by the printing image processing section 22 to form synthesized image information. The checking section 24 functions as checking means. The checking section 24 checks whether or not the sub-information embedded in the synthesized image information can be correctly restored based on the synthesized image information printed on the personal authentication medium.

The bidirectional communicating sections 16, 17, 18, 19 are each configured by an interface which performs data communication in each device. For example, as the bidirectional communicating sections 16, 17, 18, 19, any means which can bidirectionally communicate signals such as USB, SCSI can be used. In this example, a case wherein USB2.0 is used as the bidirectional communicating sections 16, 17, 18, 19 is explained below.

Next, the operation of the personal authentication medium issuing apparatus 1A with the above configuration is explained.

FIG. 2 is a flowchart for illustrating the operation of the personal authentication medium issuing apparatus 1A.

First, the operator inputs a face image which is main image information by use of the image input device 11 and inputs character information such as personal management information (for example, ID number, name, date of birth, address, period of validity and the like) by use of the input/output device 12 (step S1). The face image input by use of the image input device 11 is stored into the storage section 25 in correspondence to the personal management information input via the input/output device 12. In the following explanation, mainly, the process for the face image in the personal authentication medium issuing apparatus 1A is explained.

In the computer 15A, the preprocessing operation by the preprocessing section 20, the checking process determining operation by the checking process determining section 21, the printing image processing operation by the printing image processing section 22 and the electronic watermark embedding operation by the electronic watermark embedding section 23 are sequentially performed for the face image input from the image input device 11 and the operation results are supplied to the printer 14.

The preprocessing section 20 performs the preprocessing operation for the face image (main image) input from the image input device 11 (step S2). In this case, if the preprocessing operation is performed when a new personal authentication medium is formed, the preprocessing section 20 performs a normal image processing operation such as a noise reduction process, high frequency emphasis process and brightness correction process for a face image used as a main image by use of the first image processing section 20a. Further, if the preprocessing process is performed when a personal authentication medium is re-formed, the preprocessing section 20 performs an image processing operation for a face image input used as the main image by use of the first image processing section 20a and performs a gradation correction process by use of the second image processing section 20b. The gradation correction process by the second image processing section 20b will be explained in detail later.

When the face image is subjected to the preprocessing operation by the preprocessing section 20, the checking process determining section 21 performs a determination process to determine whether a personal authentication medium formed by use of the face image preprocessed by the preprocessing section 20 is checked or not after the forming process (step S3). For example, the checking process determining section 21 performs the determination process by use of the histogram explained below to determine whether or not it is required to check the formed personal authentication medium.

Figure 3:
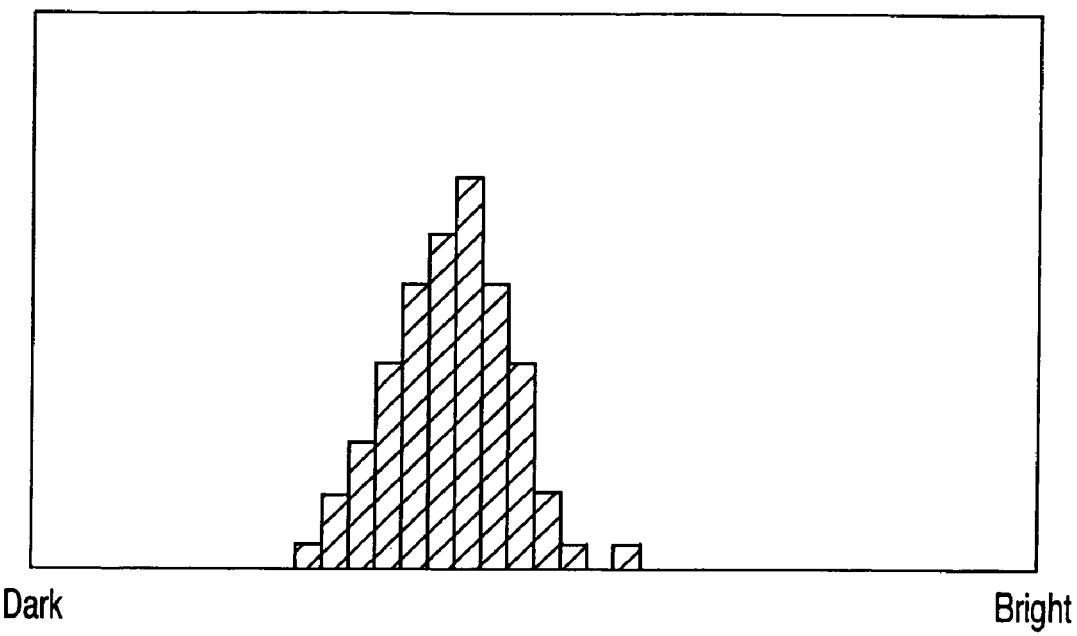
FIG. 3 is a diagram showing one example of a histogram of a face image.

FIG. 3 shows one example of the histogram of a general face image (main image information). FIG. 3 shows the histogram of luminance information obtained from a relatively bright face image. Further, in FIG. 3, the image becomes darker in a portion closer to the left end in the drawing and becomes brighter in a portion closer to the right end. As image data of a face image printed on the personal authentication medium, for example, image data configured by pixel data items having values "0 to 255" expressed by eight bits is used. In this case, "0" (the minimum value with which the printing section 14a can print) corresponds to the darkest portion and "255" (the maximum value with which the printing section 14a can print) corresponds to the brightest portion.

Figure 4:
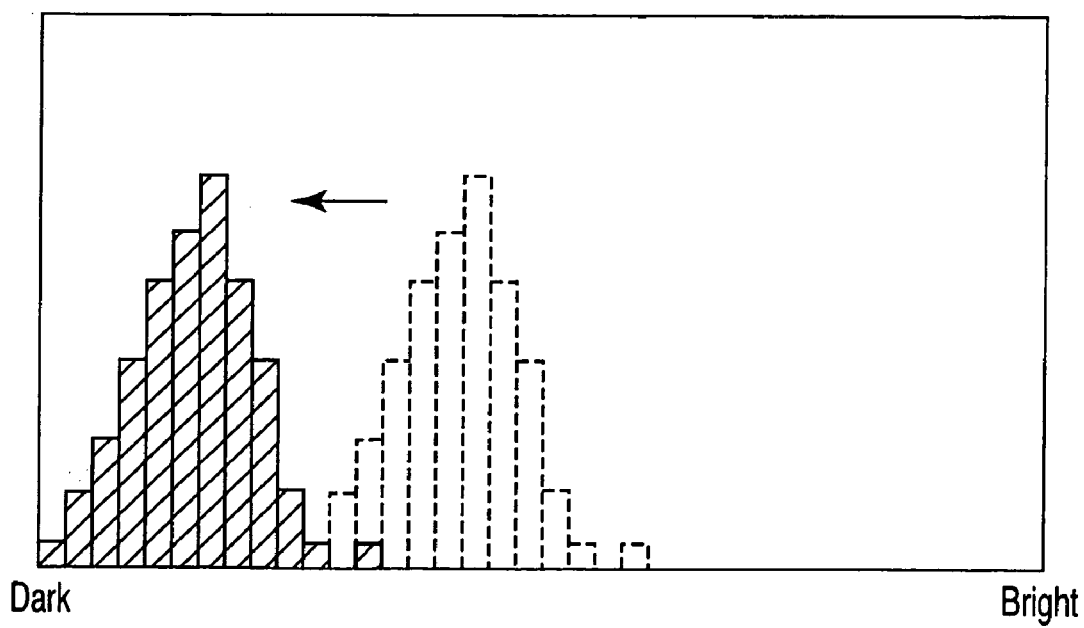
FIG. 4 is a diagram showing one example of a histogram of a face image.

In the electronic watermark technique by utilizing a color difference, sub-information is embedded in main image information by adding or subtracting a color-difference amount to or from the above 8-bit data. For example, if the image data of the face image is "0", the color-difference amount can be added thereto but cannot be subtracted therefrom. Therefore, a desired color-difference amount cannot be attained in some cases depending on image data. For example, as shown in FIG. 4, if the entire portion of the histogram of the face image moves toward the dark side, the number of image data items having values approximately equal to "0" is increased. Thus, if the histogram of the face image tends to be set closer to the value of "0" or "255", the frequency at which a desired color-difference amount cannot be attained is enhanced and it becomes difficult to restore the sub-information embedded in the face image in some cases.

Therefore, in the checking process determining section 21, the determination process which determines whether or not it is required to check a personal authentication medium on which a synthesized image having sub-information embedded in the face image is printed by referring to a standard deviation and the average value in the histogram of the face image (main image).

If the checking process determining section 21 determines whether or not it is required to perform the checking process, the printing image processing section 22 performs a process for converting image data of the face image into image data which is suitable for printing by the printer 14 (step S4). If the image input device 11 (for example, digital camera) inputs a face image configured by image data of R (red), G (green) and B (blue), the printing image processing section 22 performs a color conversion process which converts the above image data into image data of cyan (C), magenta (M) and yellow (Y) used in the printer 14. In this case, it is assumed that image data of RGB is subjected to the preprocessing operation in the preprocessing section 20.

When the image data of the face image is converted into image data suitable for printing by the printing image processing section 22, the electronic watermark embedding section 23 performs the process for embedding sub-information in the face image. The electronic watermark embedding section 23 forms synthesized image information by, for example, embedding sub-information which is formed based on the personal authentication medium and invisible to naked eyes of a human being in the face image which is converted into image data (for example, image data of C, M, Y) suitable for printing by the printing image processing section 22.

Further, the electronic watermark embedding section 23 transmits the thus formed synthesized image information to the printer 14 via the bidirectional communicating section 19 (step S5). At this time, the personal management information input by the input/output device 12 and the result of determination of the checking process determining section 21 are also transmitted to the printer 14 together with the synthesized image information. In this case, it is assumed that the synthesized image information, personal management information, the result of determination of the checking process determining section 21 and the like are stored in the storage section 25 as information relating to the personal authentication medium.

When the synthesized image information, personal management information and determination result of the checking process determining section 21 from the computer 15A are received, the printer 14 performs the personal authentication medium forming process by use of the printing section 14a (step S6). In the forming process, the printing section 14a forms a personal authentication medium by printing (recording) character information such as the personal management information and synthesized image information supplied from the electronic watermark embedding section 23 of the computer 15A on a recording medium.

When the personal authentication medium is formed by the printing section 14a, the sorting section 14b performs the sorting process for sorting the personal authentication medium thus formed (step S7). In the sorting process, the sorting section 14b determines whether it is required to check the personal authentication medium (synthesized image printed on a personal authentication medium) formed by the printing section 14a or not based on the determination result of the checking process determining section 21 in the computer 15A. In the sorting process, if the sorting section 14b determines that the checking process is not required, it determines that the issuing operation of the personal authentication medium is completed and discharges the personal authentication medium to the issuing tray Ta. Further, when the sorting section 14b determines that the checking process is required, it discharges the personal authentication medium to the checking tray Tb.

The checking process for checking whether or not sub-information can be restored from the synthesized image printed on the personal authentication medium is performed for the personal authentication media accumulated on the checking tray Tb. The checking process for the thus formed personal authentication media is started by causing the operator to set the personal authentication media accumulated on the checking tray Tb on a reading section (not shown) of the image input device 13 (step S8). At this time, it is possible for the image input device 13 to read the synthesized image from the personal authentication media accumulated on the checking tray Tb. In this case, it becomes possible to check the personal authentication medium formed by the printer 14 without using much labor.

When the personal authentication medium accumulated on the checking tray Tb by use of the printer 14 is set on the image input device 13, the image input device 13 supplies a signal indicating that the personal authentication medium is set on the reading section (not shown) to the computer 15A. When receiving the signal indicating that the personal authentication medium is set from the image input device 13, the computer 15A supplies a read start signal specifying a start of reading of the printing surface of the personal authentication medium to the image input device 13.

When receiving the read start signal, the image input device 13 reads an image of the printing surface (on which the synthesized image is printed) of the personal authentication medium by use of the reading section (not shown). When reading of the image of the printing surface of the personal authentication medium is completed, the image input device 13 converts the read image information on the recording surface into digital information and transmits the same to the computer 15A.

When receiving the image information converted into a digital form from the image input device 13, the computer 15A sequentially supplies the image information to the checking section 24. When reading of the personal authentication medium in the image input device 13 is completed, the checking section 24 extracts synthesized image information in the image information from the image input device 13. When the synthesized image information in the image information from the image input device 13 is extracted, the checking section 24 performs the restoring process to restore sub-information from the extracted synthesized image information.

The sub-information restoring process is performed by use of a digital band pass filtering process. The electronic watermark technique for embedding sub-information as color-difference information used in the present embodiment is to embed sub-information by superposing color-difference information on a high-frequency carrier pattern image. Therefore, the sub-information embedded in the synthesized image can be restored by use of a band pass filter which permits only the carrier pattern frequency to pass therethrough.

When sub-information is restored from the synthesized image by the sub-information restoring process, the checking section 24 performs the determination process to determine whether the restored sub-information is correct or not, that is, whether sub-information can be restored from the synthesized image or not. The determination process is performed by performing a process corresponding to the type of information used as the sub-information.

For example, when sub-information is code information such as a two-dimensional bar code, the checking section 24 can decode code information restored as sub-information by the restoring process and determine whether the decode information thus decoded is correct or not. For example, when code information used as sub-information is personal management information (for example, information expressed by numerals or characters such as an ID number, date of birth, period of validity and the like) recorded on the personal authentication medium, whether the decode information is correct or not is determined according to whether the decoded information coincides with information printed on the personal authentication medium or not.

In this case, whether the decode information is correct or not is determined according to whether the result of character recognition of character information (personal management information) recorded on the personal authentication medium coincides with information obtained by decoding the restored code information. Further, in the above case, the checking section 24 can determine whether the decode information is correct or not according to whether information stored in the storage section 25 as information printed on the personal authentication medium coincides with information obtained by decoding the restored code information.

Further, when sub-information is a fixed pattern such as characters, the checking section 24 determines whether sub-information is correct or not by recognizing the pattern of an image (pattern) restored as sub-information. That is, when sub-information is a fixed pattern such as characters, the checking section 24 determines whether sub-information is correct or not by performing the pattern recognition process for an image restored as sub-information and comparing the result of pattern recognition with the fixed pattern which is previously known.

When a pattern which can be recognized by a human being is used as sub-information, the operator may be permitted to determine whether sub-information is correct or not by displaying information (image) restored as sub-information on the display section 12b of the input/output device 12.

The result of the checking process by the checking section 24 is informed to the operator by displaying the same on the display section 12b of the computer 15A. For example, when it is determined that the sub-information is not correct, that is, the sub-information is not correctly restored by the checking process of the checking section 24, the computer 15A informs to the effect that it is necessary to re-issue the personal authentication medium since the sub-information cannot be correctly restored. Further, when it is determined that the sub-information is correct, that is, the sub-information can be correctly restored by the checking process of the checking section 24, the computer 15A informs to the effect that the personal authentication medium can be issued since the sub-information can be correctly restored.

As explained above, in the first embodiment, the checking process determining section 21 is provided to previously determine whether a personal authentication medium issued is checked or not and the sorting section 14b which sorts the personal authentication medium issued by the printer 14 according to the determination result is provided. Thus, according to the first embodiment, the time and labor required for the checking process of the personal authentication medium can be suppressed to minimum and the issuing efficiency of the personal authentication medium can be enhanced.

Next, a second embodiment of this invention is explained.

Figure 5:
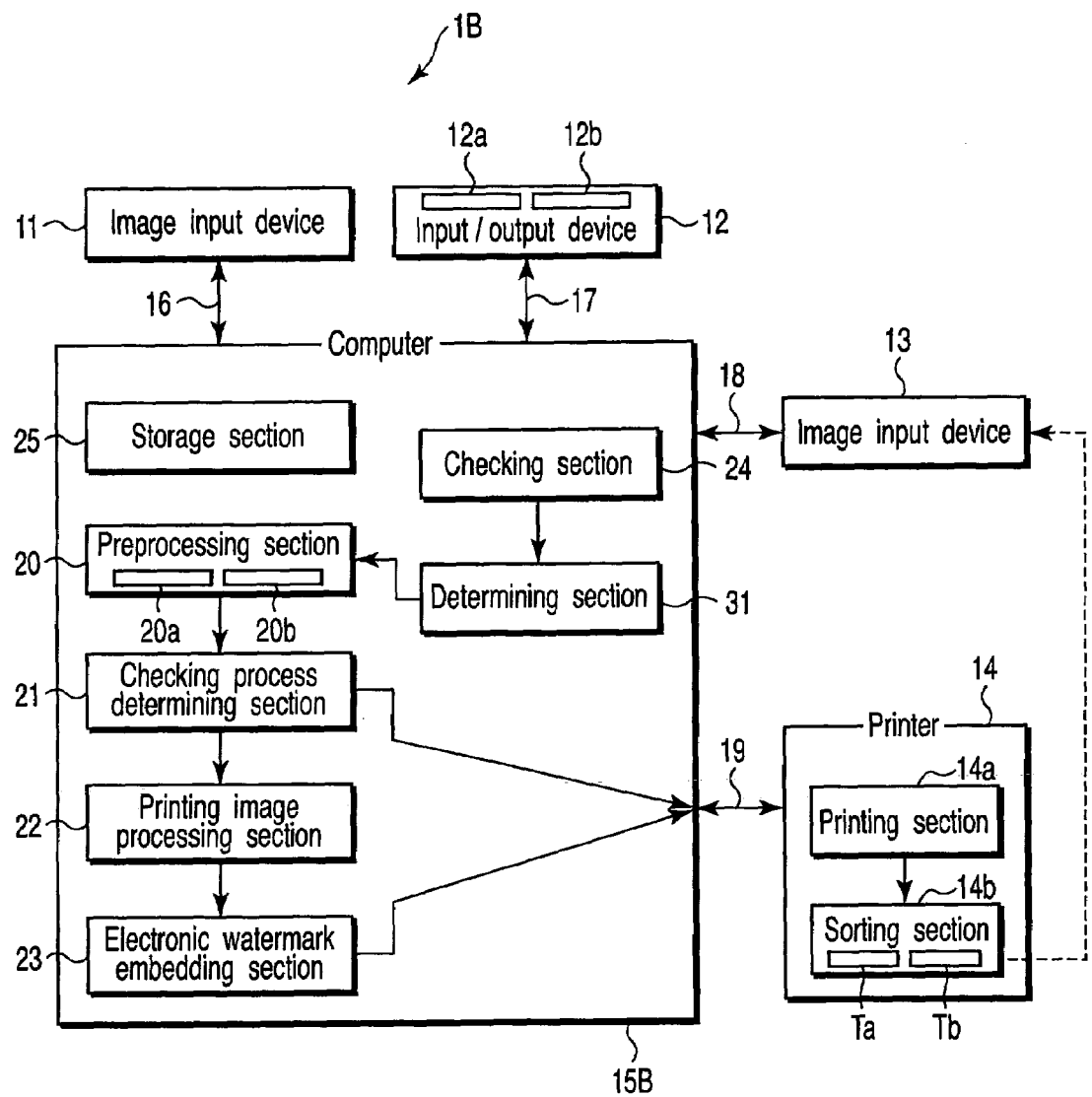
FIG. 5 is a block diagram schematically showing the configuration of a personal authentication medium issuing apparatus according to a second embodiment of this invention.

FIG. 5 is a diagram schematically showing the configuration of a personal authentication medium issuing apparatus 1B according to the second embodiment.

As shown in FIG. 5, the personal authentication medium issuing apparatus 1B according to the second embodiment includes an image input device 11, input/output device 12, image input device 13, printer 14, computer 15B and bidirectional communicating sections 16, 17, 18, 19. The computer 15B includes a preprocessing section 20, checking process determining section 21, printing image processing section 22, electronic watermark embedding section 23, checking section 24, storage section 25, determining (re-issuance control) section 31 and the like.

Like the computer 15A, the computer 15B may be configured by a PC or a dedicated board having a CPU, semiconductor memory, hard disk device, image capture board and the like formed thereon. When a PC is used as the computer 15B, the preprocessing section 20, checking process determining section 21, printing image processing section 22, electronic watermark embedding section 23, checking section 24 and determining section 31 are configured by part of an application program executed by the PC.

The personal authentication medium issuing apparatus 1B shown in FIG. 5 has a configuration obtained by adding the determining section 31 to the personal authentication medium issuing apparatus 1A of FIG. 1. Therefore, in the explanation for the second embodiment, the same reference symbols are attached to portions which are the same as those of the first embodiment and the detail explanation thereof is omitted.

The determining section 31 performs the determining process to determine whether the personal authentication medium is re-issued or not based on the result of the checking process of the checking section 24. In the personal authentication medium issuing apparatus 1B, the checking section 24 informs the determining section 31 that sub-information could not be correctly restored when the sub-information could not be correctly restored from an image (an image on the printing surface of the formed personal authentication medium) received from the image input device 13. Further, when sub-information could be correctly restored from an image (an image on the printing surface of the formed personal authentication medium) received from the image input device 13, the checking section 24 informs the determining section 31 that the sub-information could be correctly restored.

In the determining section 31, whether the personal authentication medium is re-issued or not is determined based on information indicating the checking result from the checking section 24. That is, when receiving information to the effect that the sub-information could not be correctly restored from the checking section 24, the determining section 31 determines that the personal authentication medium should be re-issued. Further, when receiving information to the effect that the sub-information could be correctly restored from the checking section 24, the determining section 31 determines that re-issuance of the personal authentication medium is not necessary and issuance of the personal authentication medium is completed.

Next, the flow of the process of the personal authentication medium issuing apparatus 1B according to the second embodiment is explained.

Figure 6:
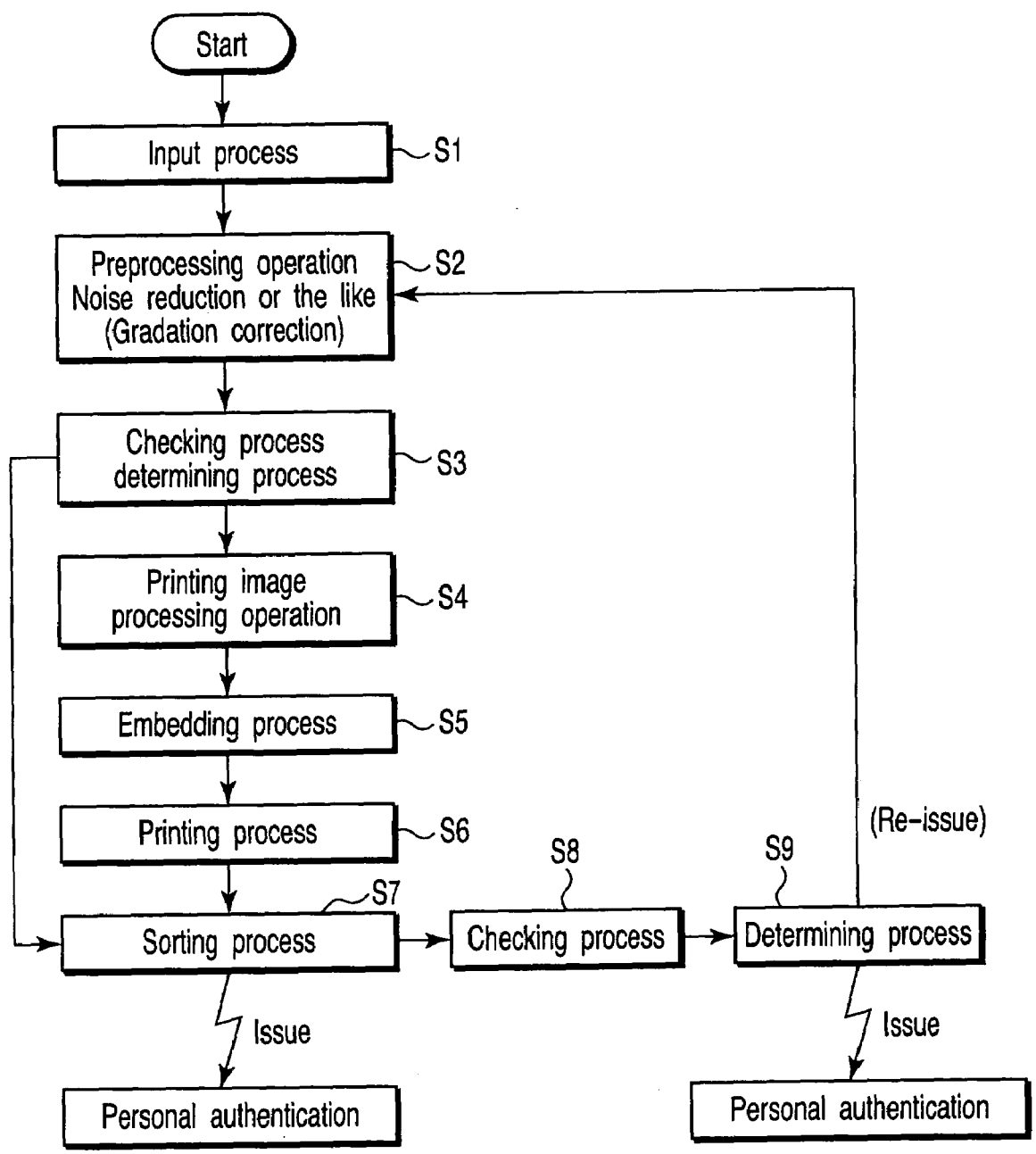
FIG. 6 is a flowchart for illustrating the flow of the process of the personal authentication medium issuing apparatus according to the second embodiment.

FIG. 6 is a flowchart for illustrating the flow of the process of the personal authentication medium issuing apparatus 1B according to the second embodiment.

The process of the steps S1 to S8 shown in FIG. 6 is the same as the process of the steps S1 to S8 shown in the flowchart of FIG. 2 explained in the first embodiment. Therefore, in the explanation of the second embodiment, the explanation of the steps S1 to S8 is omitted. However, in the second embodiment, it is assumed that the checking section 24 informs the checking result to the determining section 31 in the step S8.

That is, when receiving information on the result of the checking process performed by the checking section 24, the determining section 31 determines whether the personal authentication medium is re-issued or not (step S9). As described before, in the determining section 31, it is determined that the personal authentication medium should be re-issued when information to the effect that the sub-information could not be correctly restored is received as the checking result from the checking section 24. Further, the determining section 31 determines that re-issuance of the personal authentication medium is not necessary when information to the effect that the sub-information could be correctly restored is received as the checking result from the checking section 24.

When it is determined that the personal authentication medium should be re-issued, the determining section 31 supplies a re-issuance signal (which contains personal management information specifying the personal authentication medium to be re-issued) which requests re-issuance of the personal authentication medium and a gradation correction level signal indicating the gradation correction level for the face image (main image information) of the personal authentication medium to the preprocessing section 20.

The preprocessing section 20 which has received the re-issuance signal from the determining section 31 reads out a face image of the personal authentication medium which is determined to be re-issued from the storage section 25. The reading process is performed to retrieve personal management information (for example, ID number) contained in the re-issuance signal from the storage section 25 and reads out and supplies a face image corresponding to the personal management information.

Thus, when the face image for the personal authentication medium to be re-issued is read out from the storage section 25, the preprocessing section 20 performs the preprocessing operation again with respect to the readout face image by the first image processing section 20a as in the step S2. Further, the preprocessing section 20 subjects the face image to the gradation correction process corresponding to the gradation correction level signal informed from the determining section 31 by the second image processing section 20b. In the personal authentication medium issuing apparatus 1B, as the re-issuance process of the personal authentication number, the process succeeding to the step S3 is performed again after the preprocessing process by the preprocessing section 20.

Next, the gradation correction process for the face image (main image) is explained in detail.

Figure 7:
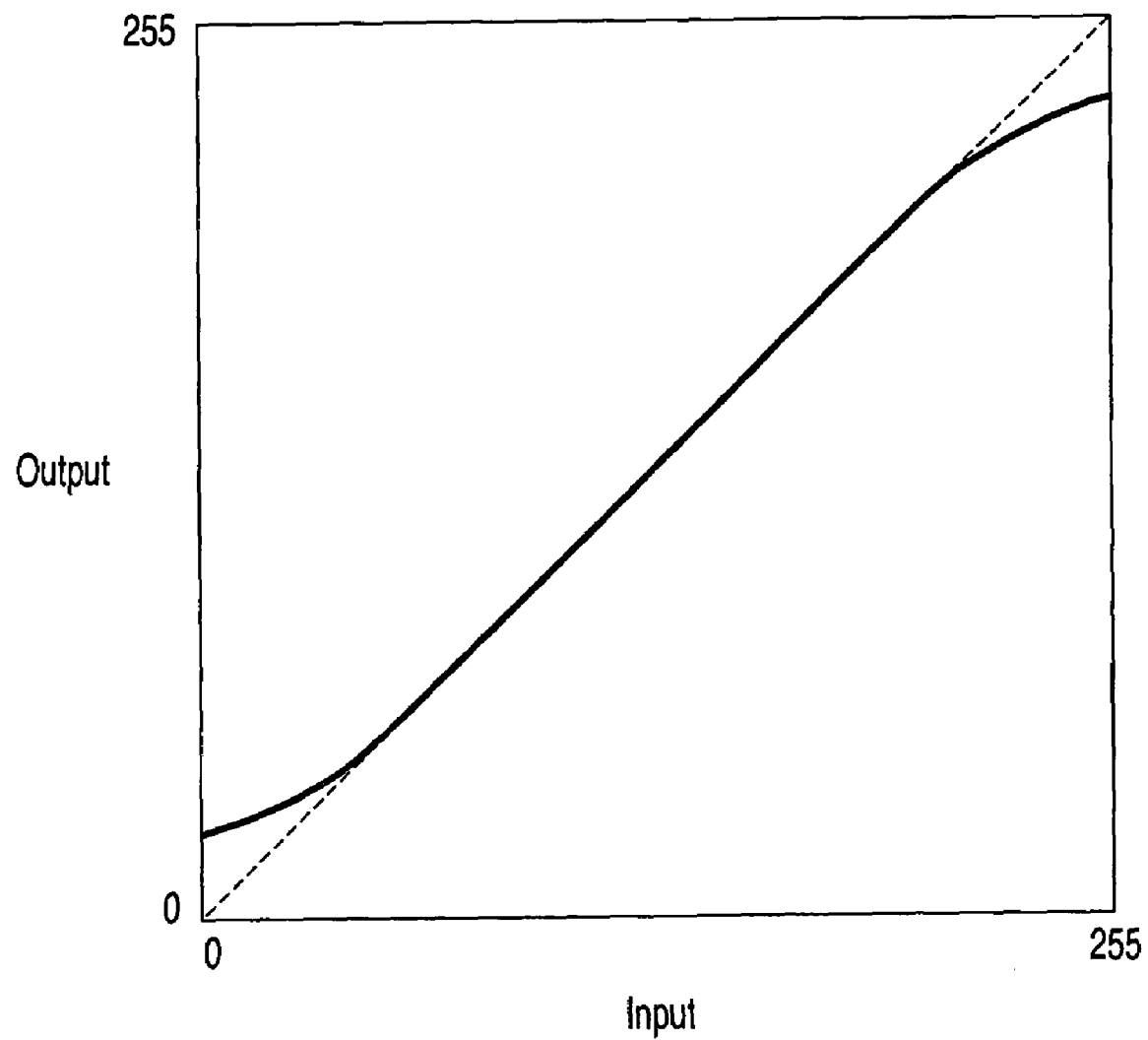
FIG. 7 is a diagram for illustrating a gradation correction process.

FIG. 7 is a diagram for illustrating one example of the gradation correction process. FIG. 7 is a diagram showing an example of output data (luminance signal) with respect to input data (luminance signal).

First, when the gradation correction process is not performed, output data items of various values "0 to 255" are allocated for input data items of various values "0 to 255". That is, when the gradation correction process is not performed, gradation of the input data is held and input data and output data are set to the same gradation data.

When the gradation correction process is performed, values near "0" (the minimum value which can be printed by the printing section 14a) and values near "255" (the maximum value which can be printed by the printing section 14a) of the input data of various values "0 to 255" are corrected. That is, in the gradation correction process, values near "0" and values near "255" of the input data are corrected according to the correction level. For example, in the gradation correction process, gradation correction is made to set output data as indicated by the slid line with respect to the input data indicated by dotted lines as shown in the example of FIG. 7. The example of FIG. 7 shows a case wherein the gradation correction process is performed to correct data of a value near "0" to data of a value (a value corresponding to the correction level) not smaller than a certain value and correct input data of a value near "255" to data of a value (a value corresponding to the correction level) not larger than a certain value. As a result, in the example of FIG. 7, the input data indicated by the dotted lines is corrected to the output data indicated by the solid line.

Further, the correction level for gradation correction is set according to a color-difference amount which is used to embed sub-information. That is, the gradation correction process is a process for giving a color difference used to embed sub-information in the face image (main image). Therefore, the correction level in the gradation correction process is set so that the face image may have gradation required to embed sub-information therein. For example, when the color-difference amount used to embed sub-information is "16", the correction level is set so that data of a value "0" may be set to a value not smaller than "16" and data of a value "255" may be set to a value not larger than "239". Further, in order to stably attain a certain color-difference amount, it is possible to set data of a value "0" to a value equal to or larger than "24" and set data of a value "255" to a value equal to or smaller than "231".

According to the above gradation correction process, a preset color-difference amount can be added to and subtracted from the face image (main image information). As a result, sub-information can be stably embedded and a personal authentication medium can be stably issued.

In the second embodiment, the correction level in the gradation correction process is determined by the determining section 31. Therefore, in the second embodiment, the preprocessing section 20 performs the gradation correction process according to a gradation correction level signal from the determining section 31.

Next, a third embodiment of this invention is explained.

Figure 8:
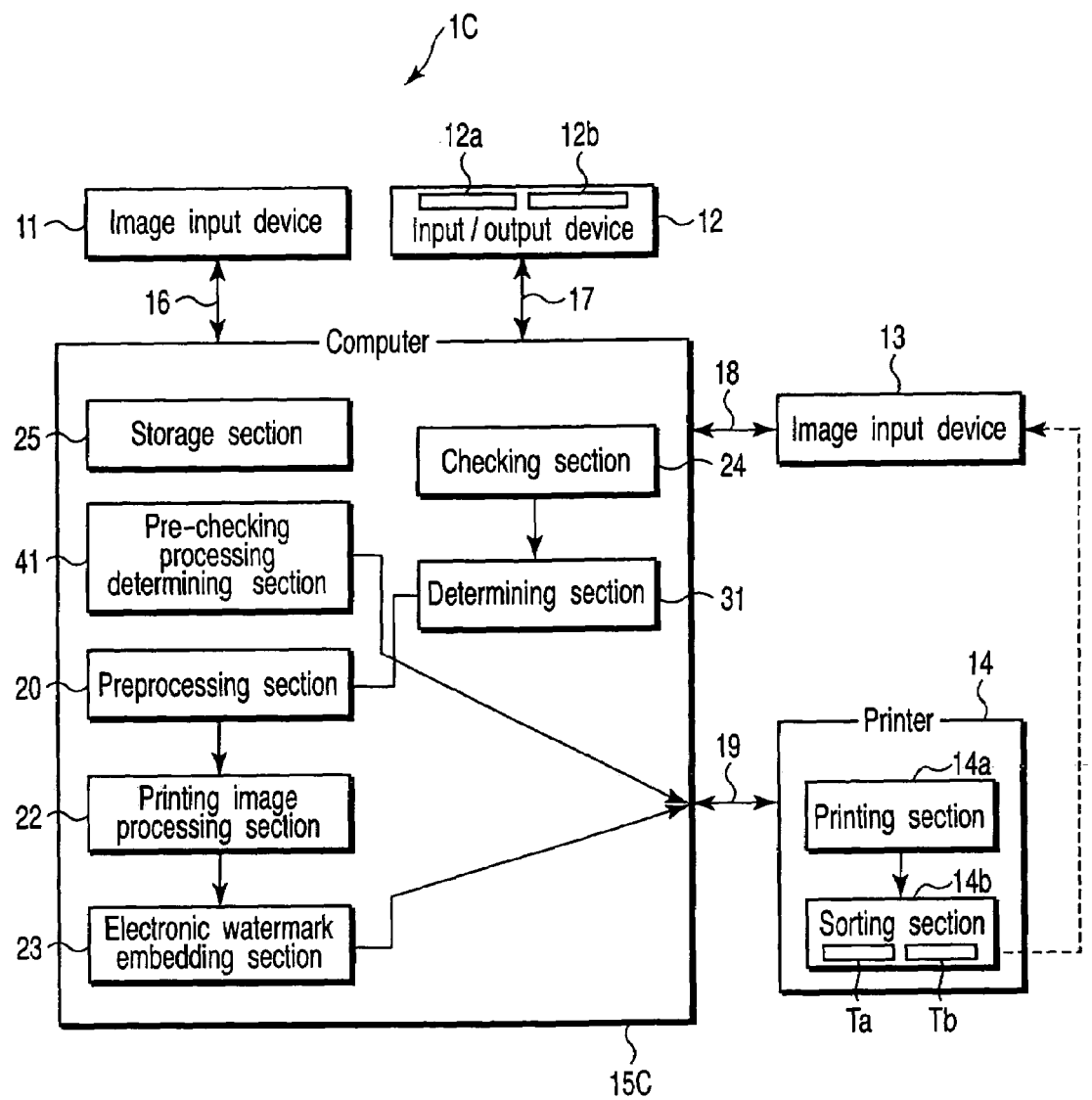
FIG. 8 is a block diagram schematically showing an example of the configuration of a personal authentication medium issuing apparatus according to a third embodiment of this invention.

FIG. 8 schematically shows the configuration of a personal authentication medium issuing apparatus 1C according to the third embodiment.

As shown in FIG. 8, the personal authentication medium issuing apparatus 1C according to the third embodiment includes an image input device 11, input/output device 12, image input device 13, printer 14, computer 15C and bidirectional communicating sections 16, 17, 18, 19. The computer 15C includes a preprocessing section 20, printing image processing section 22, electronic watermark embedding section 23, checking section 24, storage section 25, determining section 31, pre-checking process determining section 41 and the like.

Like the computers 15A and 15B, the computer 15C may be configured by a PC or a dedicated board having a CPU, semiconductor memory, hard disk device, image capture board and the like formed thereon. When a PC is used as the computer 15C, the preprocessing section 20, printing image processing section 22, electronic watermark embedding section 23, checking section 24, determining section 31 and pre-checking process determining section 41 are configured by part of an application program executed by the PC.

The personal authentication medium issuing apparatus 1C shown in FIG. 8 has a configuration obtained by using the pre-checking process determining section 41 instead of the checking process determining section 21 in the configuration of the personal authentication medium issuing apparatus 1B of FIG. 5. Therefore, in the explanation for the third embodiment, the same reference symbols are attached to portions which are the same as those of the first and second embodiments and the detail explanation thereof is omitted.

The pre-checking process determining section 41 determines necessity of the checking process with respect to a personal authentication medium formed and necessity of a gradation correction process as the preprocessing operation based on the face image (main image) input from the image input device 11. That is, in the pre-checking process determining section 41, necessity of the checking process with respect to a personal authentication medium formed and necessity of the gradation correction process as the preprocessing operation with respect to the main image by the preprocessing section 20 are determined by analyzing the face image (main image) input from the image input device 11.

In the pre-checking process determining section 41, it is assumed that the above determination process is performed by use of the histogram of an image in an area of the face image (main image) input from the image input device 11 in which sub-information is embedded. Therefore, when receiving the face image input from the image input device 11, the pre-checking process determining section 41 detects an area of the face image in which sub-information is embedded. If an area of the face image in which sub-information is embedded is detected, the pre-checking process determining section 41 forms a histogram of the image of the detected area.

When the histogram of the image of the area in which sub-information is embedded is formed, the pre-checking process determining section 41 determines whether the gradation correction process for the face image as a main image is necessary or not and whether a personal authentication medium formed is checked or not based on the frequency of appearance of pixels having values near the minimum luminance value (for example, "0") and the frequency of appearance of pixels having values near the maximum luminance value (for example, "255"). Further, in the pre-checking process determining section 41, it is possible to determine a correction level used for gradation correction based on the frequency of appearance of pixels having values near the minimum and maximum luminance values. In this case, the correction level of gradation correction is supplied from the pre-checking process determining section 41 to the preprocessing section 20 as a gradation correction level signal.

Figure 9:
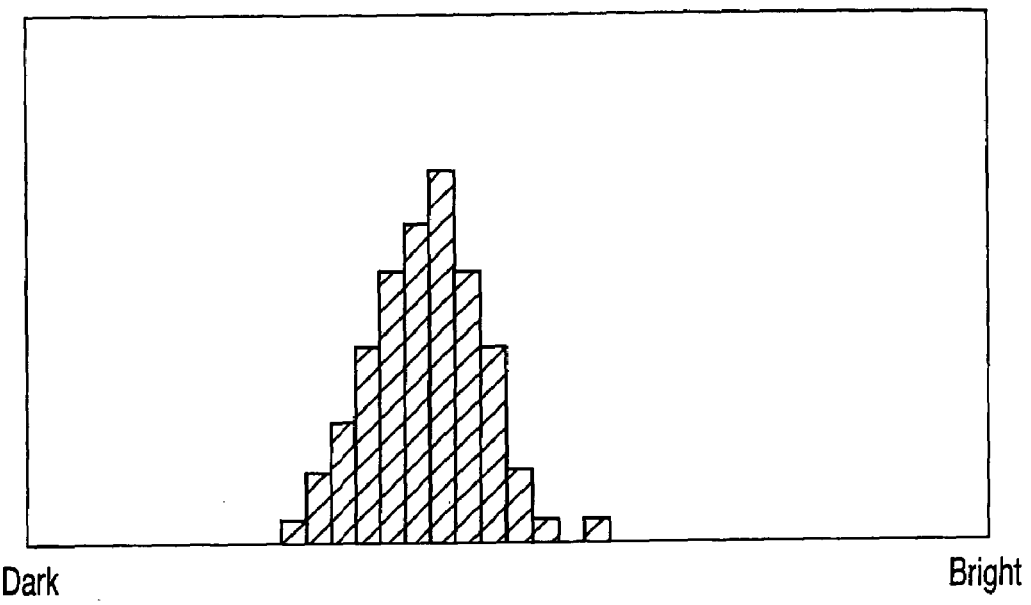
FIG. 9 is a diagram showing an example of a histogram of an image of an area of a face image in which sub-information is embedded.
Figure 10:
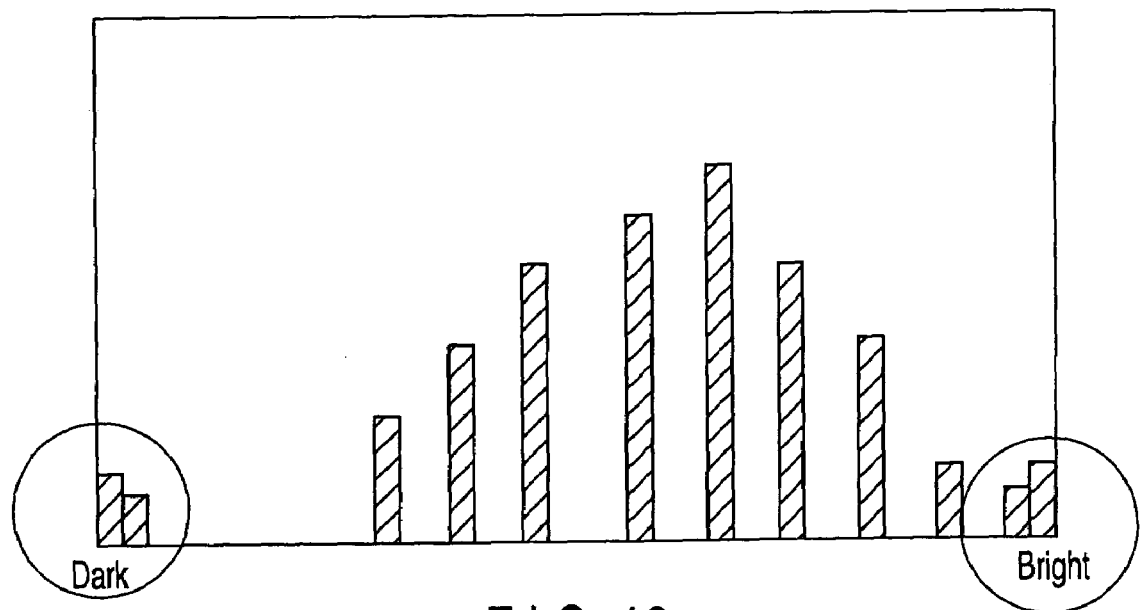
FIG. 10 is a diagram showing an example of a histogram of an image of an area of a face image in which sub-information is embedded.

For example, FIGS. 9 and 10 are diagrams each showing an example of a histogram of an image of an area of the face image in which sub-information is embedded. The histogram in the example of FIG. 9 shows luminance information in pixels which are relatively bright and have a less variation in the gradation. In each of the examples of FIGS. 9 and 10, the frequency of appearance of pixels which become darker in a portion closer to the left end in the drawing and the frequency of appearance of pixels which become brighter in a portion closer to the right end are shown.

In this example, a case wherein each pixel of image data is configured by 8-bit data having a value of "0" to "255" as a luminance value is explained. In this case, "0" corresponds to the darkest pixel and "255" corresponds to the brightest pixel. As described before, in the electronic watermark technique for embedding sub-information in the main image by use of a color difference, sub-information is embedded by adding or subtracting a color-difference amount to or from images of pixels configuring the main image (in this example, face image). For example, when image data as the main image is configured by pixels having a value of "0", the color-difference amount can be added to the main image, but it cannot be subtracted from the main image. Further, if image data as the main image is configured by pixels having a value of "255", the color-difference amount can be subtracted from the main image, but it cannot be added to the main image. Therefore, it is impossible to acquire a desired color-difference amount (a color-difference amount required to embed sub-information) depending on the luminance distribution of image data as the main image in some cases.

For example, as shown in FIG. 10, if the luminance distribution of the histogram of image data extends in a wide range and the gradation greatly varies, the frequency of appearance of pixels having values near "0" and "255" is significantly enhanced. If the above image data is used as the main image, the frequency of appearance of pixels which cannot permit a desired color-difference amount required for embedding sub-information to be obtained due to the reason described above is enhanced. If sub-information is embedded in the above image data, it becomes difficult to restore the sub-information in many cases.

Therefore, in the pre-checking process determining section 41, whether the gradation correction process is performed for the main image or not and whether a personal authentication medium formed is checked or not are determined according to the frequency of appearance of pixels having values near "0" and "255" in the area of the main image in which sub-information is embedded. The gradation correction process by the second image processing section 20b of the preprocessing section 20 is the same as that explained in the second embodiment with reference to FIG. 7. For example, if the color-difference amount required for embedding sub-information is set to "16", the pre-checking process determining section 41 can determine that the gradation correction process and the checking process are performed according to whether or not the number of pixels of image data having values not larger than "16" is larger than a preset number (for example, four pixels).

Next, the process of the personal authentication medium issuing apparatus 1C according to the third embodiment is explained.

Figure 11:
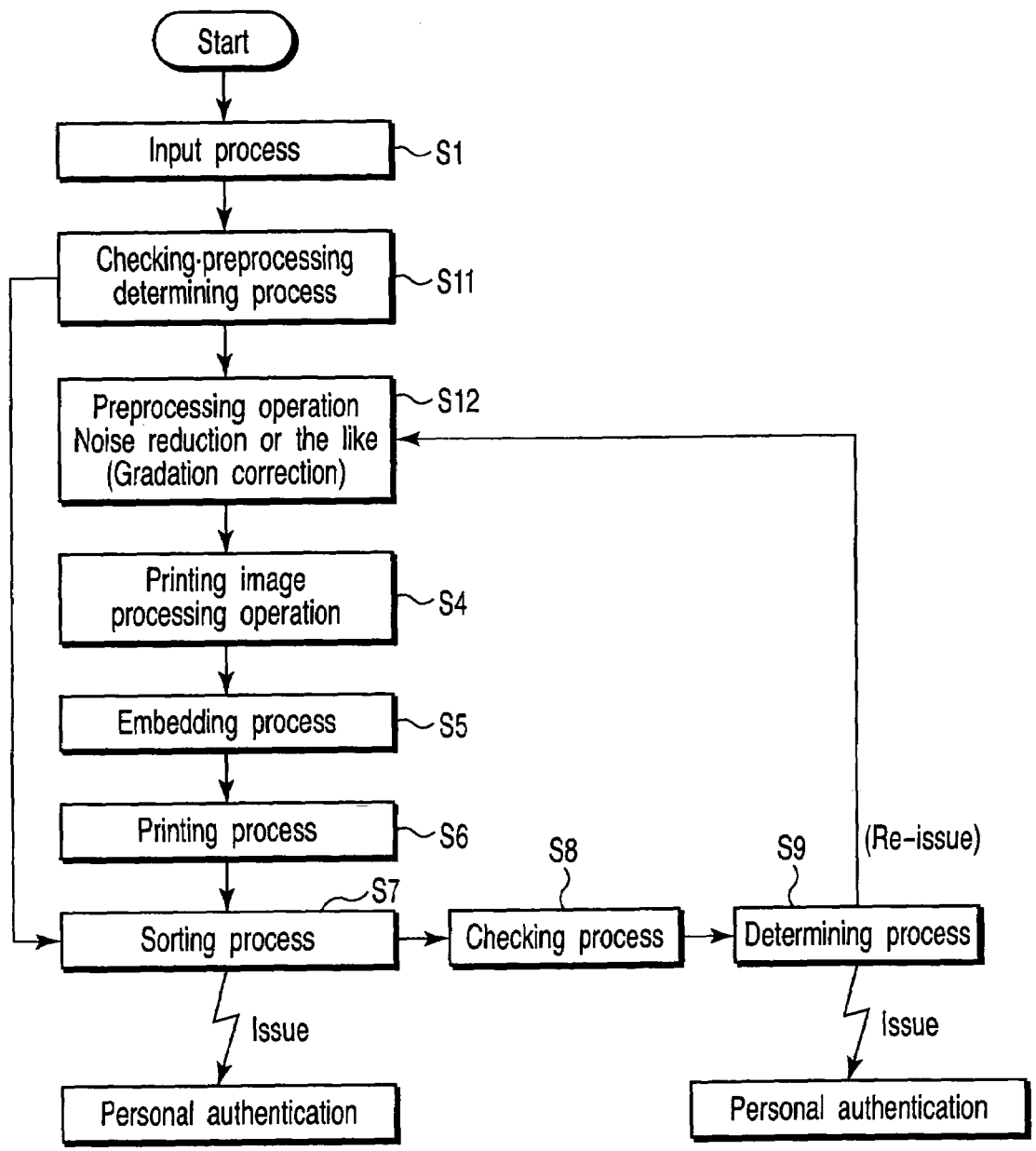
FIG. 11 is a flowchart for illustrating the flow of the process of the personal authentication medium issuing apparatus according to the third embodiment.

FIG. 11 is a flowchart for illustrating the flow of the process of the personal authentication medium issuing apparatus 1C according to the third embodiment.

The process of the steps S1, S3 to S9 is the same as the process of the steps S1, S3 to S8 shown in the flowchart of FIG. 2 explained as the first embodiment and in the flowchart of FIG. 6 explained as the second embodiment. Therefore, in the explanation of the third embodiment, the explanation of the steps S1, S3 to S8 is omitted.

That is, when a face image as a main image is input from the image input device 11 in the step S1, the pre-checking process determining section 41 determines whether the gradation correction process for the image in an area of the face image in which sub-information is embedded is performed or not and whether a personal authentication medium formed is checked or not (step S11).

If it is determined in the above determination step that the gradation correction process is performed, the pre-checking process determining section 41 supplies a signal indicating that the gradation correction process is performed for the face image to the preprocessing section 20. At this time, the pre-checking process determining section 41 may supply a correction level of gradation correction with respect to the face image as a gradation correction level signal to the preprocessing section 20.

Further, if the pre-checking process determining section 41 determines in the above determination step that the personal authentication medium formed is checked, it informs the printer 14 that the personal authentication medium is sorted to the checking tray Tb (the personal authentication medium is required to be checked).

Next, the preprocessing section 20 performs the preprocessing operation for the face image (step S12). At this time, if information indicating that the gradation correction process for the face image is not required is received from the pre-checking process determining section 41, the preprocessing section 20 performs a normal image processing operation such as a noise reduction process, high frequency emphasis process and brightness correction process for the face image by use of the first image processing section 20*a*. Further, if information indicating that the gradation correction process for the face image is required is received from the pre-checking process determining section 41, the preprocessing section 20 performs an image processing operation for the face image as the main image by use of the first image processing section 20*a* and performs the gradation correction process for the face image by use of the second image processing section 20*b*.

As a result, the personal authentication medium issuing apparatus 1C performs the personal authentication medium issuing process by performing the process of the steps S4 to S9 by use of the face image preprocessed by the above process.

As described above, in the third embodiment, whether the gradation correction process for the face image as the main image is necessary or not is determined in the preceding stage of the preprocessing operation and the face image as the main image is subjected to the gradation correction process in the preprocessing operation based on the result of determination. Thus, according to the third embodiment, the preprocessing operation such as the gradation correction process can be efficiently performed for the main image and sub-information can be embedded in the main image without fail. As a result, the possibility of re-forming the personal authentication medium can be reduced and the issuing efficiency of the personal authentication medium can be enhanced.

Next, a fourth embodiment of this invention is explained.

In the fourth embodiment, a printed matter 51 issued from the personal authentication medium issuing apparatus explained in the first, second or third embodiment is explained.

Figure 12:
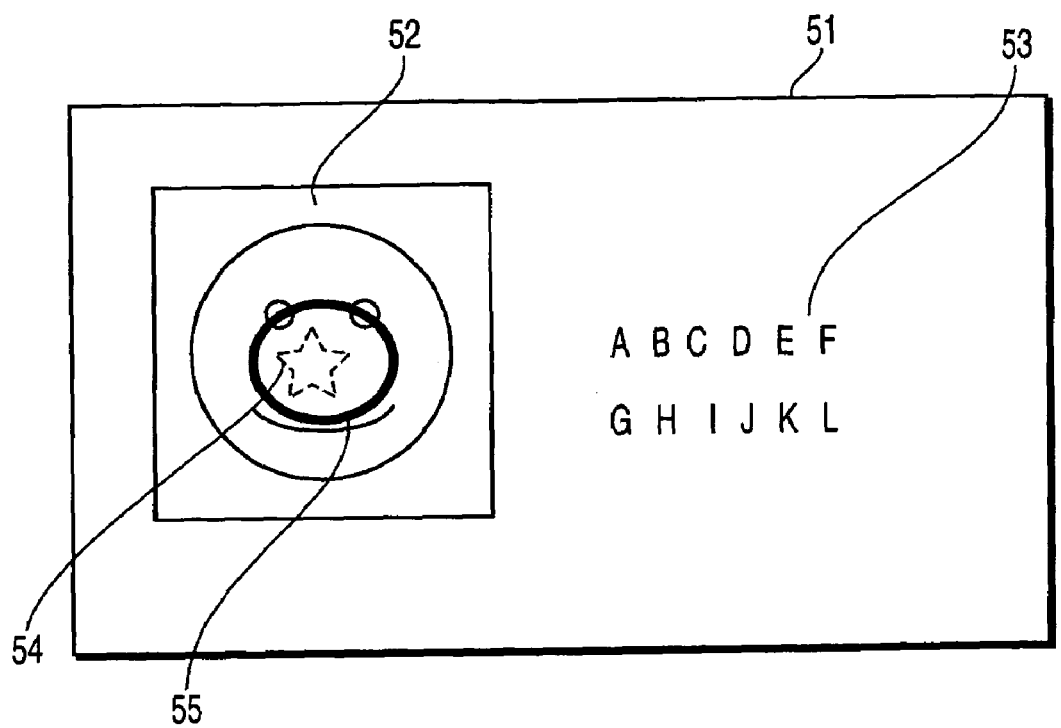
FIG. 12 is a diagram showing an example of a printed matter according to a fourth embodiment of this invention.

FIG. 12 is a diagram showing an example of the printed matter 51 as a personal authentication medium issued (formed) in the first, second or third embodiment.

As shown in FIG. 12, a synthesized image 52 and character information 53 are printed on the printed matter 51. The character information 53 indicates personal management information (for example, ID number, name, date of birth, address, period of validity and the like). As the character information 53, information corresponding to application service of the printed matter 51 is printed. For example, when the printed matter 51 is used as an employee certificate, the name or employee's number is printed as the character information 53.

The synthesized image 52 is set in a state in which sub-information 54 is embedded in the face image as the main image. In FIG. 12, it is assumed that the sub-information 54 is embedded in an area 55 of the synthesized image 52. In the synthesized image 52, the sub-information 54 is embedded in the face image by use of the electronic watermark technique using a color-difference amount as explained in the above embodiments. That is, the synthesized image 52 is visually recognized as a face image to the eyes of a human being. The sub-information 54 embedded in the synthesized image 52 cannot be visually recognized to the eyes of a human being in the normal state. In FIG. 12, the sub-information 54 set in the invisible state in the synthesized image 52 is shown.

Figure 13:
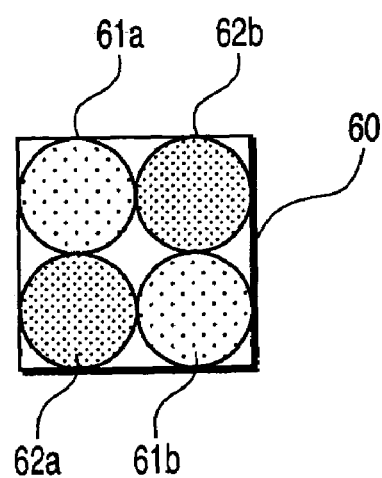
FIG. 13 is a diagram showing an example of a pattern of four pixels printed in part of an area in a synthesized image.

FIG. 13 is a diagram showing an example of a pattern of four pixels printed in part of an area in the synthesized image 52. For example, in the electronic watermark technique using a color-difference amount to embed the sub-information in the main image, as shown in FIG. 13, pixels 61*a*, 61*b* having a large amount of red components and pixels 62*a*, 62*b* having a small amount of red components (having a large amount of cyan components which are complementary to red components) make pairs and form a block (carrier pattern). The block (carrier pattern) is so adjusted that the average value of the pixels in the block will be set equal to the color concentration value (or may be set equal to a luminance value of RGB).

The synthesized image 52 of the printed matter 51 is formed by the process explained in the first, second or third embodiment. Therefore, the color concentration value of the block configured by four pixels as shown in FIG. 13 is set to a value which is smaller than the maximum concentration value of the main image (or printing ink) used as the source of the synthesized image 52 or larger than the minimum concentration value thereof. The pixels with the maximum concentration value (and the concentration values near the maximum concentration value) are corrected to pixels having values smaller than the above concentration values by the gradation correction process explained in the first, second or third embodiment. Further, the pixels with the minimum concentration value (and the concentration values near the minimum concentration value) are corrected to pixels having values larger than the above concentration values.

For example, in the third embodiment, when pixels of a number larger than a preset number which have values smaller than a preset value (a value near the minimum luminance value (or minimum concentration value) or pixels of a number larger than a preset number which have values larger than a preset value (a value near the maximum luminance value (or maximum concentration value) are present in the face image input as the main image, the pre-checking process determining section 41 determines that the main image is subjected to gradation correction. The preprocessing section 20 corrects pixels having values smaller than a preset value or pixels having values larger than a preset value based on the result of the determination process for determining whether or not the gradation correction process is performed by the pre-checking process determining section 41. As a result, in the synthesized image 52 in which the sub-information 54 is embedded, the number of pixels having values smaller than the preset value or pixels having values larger than the preset value is set to be smaller than a preset number.

As described above, on the printed matter issued (formed) by the process of the first, second or third embodiment, neither the pixels having values smaller than the preset value nor the pixels having values larger than the preset value are present and a synthesized image in which sub-information is embedded and which is visually recognized as the face image to the eyes of a human being in printed. Therefore, according to the above printed matter, sub-information can be restored without fail from the synthesized image which is visually recognized as the face image to the eyes of a human being.

Next, a fifth embodiment of this invention is explained.

In the fifth embodiment, a truth determination apparatus which determines the truth or not of the printed matter 51 explained in the fourth embodiment and issued by the process explained in the first, second or third embodiment is explained. In this example, truth determination is to determine whether or not the printed matter 51 is issued by the process explained in the first, second or third embodiment.

FIG. 14 is a diagram schematically showing an example of the configuration of a truth determination apparatus 71 for a printed matter according to the fifth embodiment.

As shown in FIG. 14, the truth determination apparatus 71 includes an image input device 72, input/output deice 73, computer 74, bidirectional communicating sections 75, 76 and the like.

The image input device 72 reads an image on the printing surface of a printed matter as a personal authentication medium. The image input device 72 functions as image input means for reading image information such as synthesized image information printed on the printed matter. The image input device 72 optically reads synthesized image information recorded on the printed matter and converts the same into digital image information. For example, the image input device 72 is configured by a flatbed scanner or digital camera. In this example, a case wherein the image input device 72 utilizes a line scanner with the optical resolution of 1200 dpi and reading resolution of 1200 dpi, for example, is explained.

The input/output deice 73 includes an operating section 73a and display section 73b, for example. The operating section 73a is configured by a keyboard and is operated by an operator to input an operation instruction. The display section 73b is configured by a display or the like and displays various information items such as the result of truth determination, operation guidance and the like.

The computer 74 includes a carrier analyzing section 81, color concentration analyzing section 82, simplified determination processing section 83, electronic watermark restoring section 84, determination processing section 85, storage section 86 and the like. For example, the computer 74 may be configured by a PC or a dedicated board having a CPU, semiconductor memory, hard disk device, image capture board and the like formed thereon. A case wherein the computer 74 is configured by a PC is explained below. When a PC is used as the computer 74, the carrier analyzing section 81, color concentration analyzing section 82, simplified determination processing section 83, electronic watermark restoring section 84, determination processing section 85 and the like are configured by part of an application program executed by the PC.

The storage section 86 stores various data items used in the process of the computer 74. For example, in the storage section 86, image data of the printing surface of the printed matter read by the image input device 72 is temporarily stored.

The carrier analyzing section 81 performs an analyzing process to determine the presence or absence of a carrier pattern in image data (an image read from the printing surface of the printed matter) input from the image input device 72. That is, in the carrier analyzing section 81, image data of the printing surface of the printed matter 51 stored in the storage section 86 is first read out. Then, the carrier analyzing section 81 detects the synthesized image 52 from the image data of the printing surface of the printed matter 51 and detects an area 55 of the synthesized image 52 in which the sub-information 54 is embedded. Further, the carrier analyzing section 81 performs an analyzing process to determines whether a carrier pattern configured by several pixels in the area 55 of the synthesized image 52 in which the sub-information 54 is embedded is present or not.

For example, if one carrier pattern is equal to one block configured by four pixels, the carrier analyzing section 81 analyzes pixels of four blocks, that is, 16 pixels in order to perform a stable analyzing process. In this case, as shown in FIG. 13, for example, the carrier analyzing section 81 performs the analyzing process to determine whether pixels having a large amount of red information in the 16 pixels and pixels having a large amount of cyan information (having a small amount of green and yellow information) make pairs or not.

The result of analysis of the above carrier pattern is notified to the simplified determination processing section 83 from the carrier analyzing section 81.

The color concentration analyzing section 82 analyzes the average value of the concentration of respective blocks (which are carrier patterns each configured by four pixels, for example) in image data (which is an image read from the printing surface of the printed matter) input from the image input device 72. At this time, in the case of an personal authentication medium (printed matter) formed by the process explained in the first, second or third embodiment, the average value of the concentration of the respective blocks in an area in which sub-information is embedded by the electronic watermark technique is smaller than the maximum concentration value and larger than the minimum concentration value. That is, the color concentration analyzing section 82 performs the analyzing process to determine whether or not the printed matter is formed by the process explained in the first, second or third embodiment based on the average value of the concentration of the respective blocks.

For example, in the color concentration analyzing section 82, first, image data of the printing surface of the printed matter 51 stored in the storage section 86 is read out. Then, the color concentration analyzing section 82 detects the synthesized image 52 from the image data of the printing surface of the printed matter 51 and detects the area 55 of the synthesized image 52 in which the sub-information 54 is embedded. Further, the color concentration analyzing section 82 determines whether or not the average value of the concentration of respective blocks (which are each equal to a carrier pattern configured by four pixels, for example) each configured by several pixels in the area 55 is set at a concentration value in a preset range.

The concentration value in the preset range is set according to the correction level of gradation correction (for example, which is gradation correction by the preprocessing section 20) in the step of forming the printed matter. That is, the concentration value in the preset range is set by a correction value for the pixel having the maximum concentration value in the main image which is first input at the time of formation of the printed matter (personal authentication medium) and a correction value for the pixel having the maximum concentration value in the input main image. For example, when the gradation correction process as shown in FIG. 7 is performed, the concentration value in the preset range is set in a range of the concentration value with respect to output data indicated by the solid line in FIG. 7.

It is assumed that the minimum color concentration value and maximum color concentration value indicating the concentration values in the preset range are previously stored in the storage section 86 or in an internal memory (not shown) in the color concentration analyzing section 82.

The result of comparison of the minimum color concentration value and maximum color concentration value with respect to the average value of the respective blocks is notified to the simplified determination processing section 83 from the color concentration analyzing section 82.

The simplified determination processing section 83 performs the process (which is also referred to as a simplified determination process) for easily determining the truth or not of the printed matter based on the result of analysis by the carrier analyzing section 81 and color concentration analyzing section 82. That is, the simplified determination processing section 83 determines whether or not a carrier pattern is present based on the result of analysis by the carrier analyzing section 81. Further, the simplified determination processing section 83 determines whether or not the number of carrier patterns each having the color concentration value which lies outside the preset range of concentration values is smaller than a preset number based on the result of analysis by the color concentration analyzing section. By the above determinations, the simplified determination processing section 83 determines whether the printed matter is true or not based on the presence or absence of the carrier pattern and the color concentration value of each carrier pattern.

For example, if the carrier patterns are present and the number of carrier patterns having concentration values which lie outside the preset range of concentration values is smaller than a preset number, the simplified determination processing section 83 determines that the printed matter is true. If the carrier pattern is not present or carrier patterns of a number larger than a preset number which have color concentration values lying outside the preset range of concentration values are present, the simplified determination processing section 83 determines that the possibility of the printed matter to be false is strong (the printed matter is not true).

The result of simplified determination for the printed matter is notified to the electronic watermark restoring section 84 from the simplified determination processing section 83.

The electronic watermark restoring section 84 performs the sub-information restoring process based on image data of the printed matter which is determined to be false in the simplified determination processing section 83. The sub-information restoring process by the electronic watermark restoring section 84 is the same as the process by the checking section 24, for example, and therefore, the detail explanation thereof is omitted.

The determination processing section 85 determines whether the sub-information restored by the electronic watermark restoring section 84 is correct or not. If it is determined that the sub-information restored by the electronic watermark restoring section 84 is correct, the determination processing section 85 determines that the printed matter is true. On the other hand, if it is determined that the sub-information restored by the electronic watermark restoring section 84 is not correct, the determination processing section 85 determines that the printed matter is false. The result of determination by the determination processing section 85 is displayed as the final determination result for the printed matter and as the result of truth determination of the printed matter on the display section 73b of the input/output device 73. The determination process which determines whether sub-information restored by the electronic watermark restoring section 84 is correct or not is the same as the process of the checking section 24, for example, and therefore, the detail explanation thereof is omitted.

With the above configuration, the carrier analyzing section 81 simply analyzes 16 pixels. Further, the color concentration analyzing section 82 simply calculates the histogram of the area of the synthesized image in which the sub-information is embedded. Therefore, both of the process by the carrier analyzing section 81 and the process by the color concentration analyzing section 82 can be performed at extremely high speed. On the other hand, the process for restoring the sub-information from the synthesized image is required to be performed by several times with respect to the area in which the digital filter is embedded. Therefore, the processing time for the sub-information restoring process becomes longer in comparison with that required for the process by the carrier analyzing section 81 and that required the process by the color concentration analyzing section 82. In other words, the simplified determination processing section 83 can perform the determination process for the true printed matter at high speed.

Next, the process of the truth determination apparatus 71 with the above configuration is explained.

FIG. 15 is a flowchart for illustrating the flow of the process of the truth determination apparatus 71.

First, a printed matter (personal authentication medium) which is determined to be true or not is set on the reading section (not shown) of the image input device 13. If the printed matter 51 is set on the image input device 13, the image input device 13 transmits a signal indicating that the personal authentication medium is set on the reading section (not shown) to the computer 74. When receiving the signal indicating that the personal authentication medium is set from the image input device 13, the computer 74 transmits a read start signal indicating a read start of the printing surface of the printed matter 51 to the image input device 13.

When receiving the read start signal, the image input device 13 reads an image of the printing surface (which is a surface having a synthesized image printed thereon) of the printed matter 51 by use of the reading section (not shown) (step S21). When the image of the printing surface of the printed matter 51 is read, the image input device 13 converts the read image into digital information (image data) and transmits the thus converted image data to the computer 74. When receiving the digital image data from the image input device 13, the computer 74 temporarily stores the image data into the storage section 86.

When the reading process of the printing surface of the printed matter 51 by the image input device 13 is terminated, the carrier analyzing section 81 performs the analyzing process to determine whether a carrier pattern configured by several pixels in the area 55 in which the sub-information 54 of the image data (an image read from the printing surface of the printed matter) stored in the storage section 86 is present or not (step S22).

Further, the color concentration analyzing section 82 performs the analyzing process to determine whether or not the average concentration value of the respective blocks (which are carrier patterns each configured by four pixels, for example) in the image data (an image read from the printing surface of the printed matter) stored in the storage section 86 is a concentration value in a preset range (step S23).

When the analyzing process by the carrier analyzing section 81 and the analyzing process by the color concentration analyzing section 82 are terminated, the simplified determination processing section 83 performs the simplified determination process which determines whether the printed matter is true or not in a simplified manner based on the result of analysis by the carrier analyzing section 81 and color concentration analyzing section 82 (step S24).

If it is determined by the simplified determination process of the simplified determination processing section 83 that the printed matter is true ("YES" in the step S25), the simplified determination processing section 83 displays that the printed matter is true as the result of truth determination of the printed matter on the display section 73b of the input/output device 73 (step S28).

If it is determined by the simplified determination process of the simplified determination processing section 83 that the printed matter is not true ("NO" in the step S25), the electronic watermark restoring section 84 performs the sub-information restoration process based on image data of the printed matter which is determined to be false by the simplified determination processing section 83 (step S26). If the electronic watermark restoring section 84 restores sub-information from the image data of the printed matter 51, the determination processing section 85 determines whether the sub-information restored by the electronic watermark restoring section 84 is correct or not (step S27).

Further, if the determination processing section 85 determines that the sub-information restored by the electronic watermark restoring section 84 is correct, it determines that the printed matter is true. In this case, the display section 73*b* of the input/output device 73 displays that the printed matter is true as the result of the truth determination process (step S28). If it is determined that the sub-information restored by the electronic watermark restoring section 84 is not correct, the determination processing section 85 determines that the printed matter is false. In this case, the display section 73*b* of the input/output device 73 displays that the printed matter is false as the result of the truth determination process (step S28).

As described above, in the fifth embodiment, image data of the printing surface of a printed matter is read and whether the printed matter is true or not is determined in a simplified manner based on the characteristic of image data of the printed matter. Thus, whether the printed matter is true or not can be determined in a simplified manner at high speed.

Further, in the fifth embodiment, sub-information is restored from the synthesized image printed on the printed matter which is determined to be false by the simplified determination processing section 83 and whether the printed matter is true or not is determined without fail based on whether the restored sub-information is correct or not. Thus, according to the fifth embodiment, the truth or not of the printed matter can be determined in a simplified manner in a high-speed process and the final truth determination process can be stably performed with respect to the printed matter which is determined to be false in the simplified determination process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A personal authentication medium issuing apparatus which issues personal authentication media, comprising:
    an image input device which inputs main image information,
    a determining section which determines whether a personal authentication medium issued by use of the main image information input from the image input device is checked based on the main image information,
    an electronic watermark embedding section which embeds sub-information set in an invisible state to naked eyes of a human being in main image information input from the image input device to form synthesized image information,
    a forming section which forms a personal authentication medium by printing synthesized image information formed by the electronic watermark embedding section on a recording medium, and
    a sorting section which selectively sorts personal authentication media formed by the forming section into personal authentication media determined to be completely formed and personal authentication media determined to require a checking process.

2. The personal authentication medium issuing apparatus according to claim 1, further comprising a checking section which inputs a read image containing synthesized image information printed on the personal authentication medium sorted as a personal authentication medium which requires a checking process by the sorting section and restores the sub-information from the input image.

3. The personal authentication medium issuing apparatus according to claim 2, further comprising a second determining section which determines whether the personal authentication medium is re-formed according to whether the sub-information restored by the checking section is correct.

4. The personal authentication medium issuing apparatus according to claim 1, further comprising a preprocessing section which subjects main image information input from the image input device to a preset preprocessing process,
    wherein the determining section determines whether a personal authentication medium issued by use of main image information preprocessed by the preprocessing section based on the main image information, and the electronic watermark embedding section forms synthesized image information by embedding sub-information in an invisible state to eyes of a human being with respect to the main image information preprocessed by the preprocessing section.

5. The personal authentication medium issuing apparatus according to claim 4, further comprising:
    a checking section which inputs a read image containing synthesized image information printed on the personal authentication medium sorted as a personal authentication medium which requires a checking process by the sorting section and restores the sub-information from the input image,
    a re-issuance control section which determines whether the personal authentication medium is re-formed according to whether the sub-information restored by the checking section is correct, and which performs a control operation to perform the process after the process by the preprocessing section again after processing contents of the preprocessing section are changed when it is determined that a personal authentication medium is to be re-formed.

6. The personal authentication medium issuing apparatus according to claim 5, wherein the preprocessing section performs a gradation correction process for main image information input by the image input device as a preprocessing operation when the re-issuance control section determines that a personal authentication medium is to be re-formed.

7. A personal authentication medium issuing apparatus which issues personal authentication media, comprising:
    an image input device which inputs main image information,
    a determining section which determines whether a gradation correction process is required for the main image information input from the image input device,
    a preprocessing section which performs a preprocessing operation containing the gradation correction process for the main image information which is determined to require a gradation correction process by the determining section and performs a preprocessing operation containing no gradation correction process for the main image information which is determined not to require a gradation correction process by the determining section, an electronic watermark embedding section which forms synthesized image information by embedding sub-information set in an invisible state to naked eyes of a human being with respect to main image information preprocessed by the preprocessing section, and a forming section which forms a personal authentication medium by printing synthesized image information formed by the electronic watermark embedding section on a recording medium.

8. The personal authentication medium issuing apparatus according to claim 7, wherein the determining section determines whether gradation correction is required for main image information according to whether pixels having values smaller than a preset minimum value and pixels having values larger than a preset maximum value which are larger in number than a preset number are present in an area in which the sub-information in the main image information input by the image input device is embedded.

9. The personal authentication medium issuing apparatus according to claim 8, wherein the preset minimum value and preset maximum value are set based on minimum and maximum values which can be printed on a recording medium by the forming section and a color-difference amount used for embedding sub-information by use of the electronic watermark embedding section.

10. The personal authentication medium issuing apparatus according to claim 7, further comprising a checking section which restores sub-information based on an image obtained by reading synthesized image information printed on a personal authentication medium by an image reading device for the personal authentication medium on which synthesized image information formed by use of main image information which is determined to require gradation correction by the determining section is printed.

11. The personal authentication medium issuing apparatus according to claim 7, further comprising:

a sorting section which selectively sorts personal authentication media formed by the forming section into personal authentication media determined to be completely formed and personal authentication media determined to require a checking process based on the result of determination by the determining section, and a checking section which restores sub-information based on an image obtained by reading synthesized image information printed on a personal authentication medium sorted as a personal authentication medium which requires a checking process by the sorting section by use of an image reading device.

12. A personal authentication medium issuing method which issues personal authentication media, comprising:

inputting main image information, determining whether a personal authentication medium formed by use of the main image information is required to be checked based on the input main image information, forming synthesized image information by embedding sub-information set in an invisible state to naked eyes of a human being with respect to the input main image information, forming a personal authentication medium by printing the thus formed synthesized image information on a recording medium, and selectively sorting the thus formed personal authentication media into personal authentication media determined to be completely formed and personal authentication media determined to require a checking process.

13. The personal authentication medium issuing method according to claim 12, further comprising restoring the sub-information based on an image obtained by reading synthesized image information printed on a personal authentication medium sorted as a personal authentication medium which requires a checking process by use of an image reading device.

14. The personal authentication medium issuing method according to claim 13, further comprising determining whether the personal authentication medium is re-formed according to whether the restored sub-information is correct.

15. The personal authentication medium issuing method according to claim 12, further comprising subjecting the input main image information to a preset preprocessing operation, wherein the determining is to determine whether the personal authentication medium formed by use of the main image information is checked based on the main image information subjected to the preprocessing operation, and the embedding the sub-information is to form synthesized image information by embedding sub-information in an invisible state to eyes of a human being with respect to the main image information subjected to the preprocessing operation.

16. The personal authentication medium issuing method according to claim 15, further comprising:

restoring sub-information based on an image obtained by reading synthesized image information printed on a personal authentication medium sorted as a personal authentication medium which requires a checking process by the sorting section by use of an image reading device, performing a control process to determine whether the personal authentication medium is re-formed according to whether the sub-information restored in the restoring process is correct, and to perform a process after the preprocessing operation after processing contents of the preprocessing process are changed when it is determined that the personal authentication medium is to be re-formed.

17. The personal authentication medium issuing method according to claim 16, wherein the preprocessing is to make gradation correction for input main image information as a preprocessing operation when it is determined in the determining process that the personal authentication medium is to be re-formed.

18. A personal authentication medium issuing method which issues personal authentication media, comprising:

inputting main image information, determining whether a gradation correction process is required for the input main image information, performing a preprocessing operation containing the gradation correction process for the main image information which is determined to require a gradation correction process by the above determining step and performing a preprocessing operation containing no gradation correction process for the main image information which is determined not to require a gradation correction process by the above determining step, forming synthesized image information by embedding sub-information set in an invisible state to naked eyes of a human being with respect to the main image information subjected to the preprocessing operation, and forming a personal authentication medium by printing the thus formed synthesized image information on a recording medium.

19. The personal authentication medium issuing method according to claim 18, wherein the determining is to determine whether gradation correction is required for the main image information according to whether pixels having values smaller than a preset minimum value and pixels having values larger than a preset maximum value which are larger in number than a preset number are present in an area of the input main image information in which the sub-information is embedded.

20. The personal authentication medium issuing method according to claim 19, wherein the preset minimum value and preset maximum value are set based on minimum and maximum values which can be printed on a recording medium and a color-difference amount used for embedding the sub-information.

21. The personal authentication medium issuing method according to claim 18, further comprising restoring sub-information based on an image obtained by reading synthesized image information printed on a personal authentication medium by use of an image reading device for the personal authentication medium on which synthesized image information formed by use of main image information which is determined to require gradation correction in the determining process is printed.

22. The personal authentication medium issuing method according to claim 21, further comprising:

selectively sorting personal authentication media formed in the forming process into personal authentication media determined to be completely formed and personal authentication media determined to require a checking process based on the result of the determining process, and restoring sub-information based on an image obtained by reading synthesized image information printed on a personal authentication medium sorted as a personal authentication media which requires a checking process by the sorting process by use of an image reading device.

23. A printed matter on which synthesized image information having sub-information embedded in main image information is printed, comprising:

carrier patterns which are each formed of a plurality of print pixels having color components set in a complementary relation to make pairs and lie in an area of the synthesized image information in which the sub-information is embedded, wherein carrier patterns of a number not larger than a preset number which are formed of a plurality of print pixels having concentration values which lie outside a preset range are not present.

24. The printed matter according to claim 23, wherein the carrier pattern is a block in which two pixels containing a large amount of certain color components and two pixels containing a large amount of color components which are complementary to the certain color components make pairs.

25. The printed matter according to claim 23, wherein the preset range is a range between a preset minimum value which is set based on a minimum value of color concentration used to print the synthesized image information and a color-difference amount used to embed the sub-information and a preset maximum value which is set based on a maximum value of color concentration used to print the synthesized image information and a color-difference amount used to embed the sub-information.

26. A truth determination apparatus for a printed matter which determines the truth of the printed matter, comprising:

an image reading device which reads an image of a printing surface of a printed matter, a first analyzing section which detects a carrier pattern formed of print pixels in which color components set in a complementary relation make pair from an image of an area in which sub-information is embedded in the image of the printing surface read by the image reading device, a second analyzing section which detects a block formed of a plurality of print pixels having concentration values which lie outside a preset range from the image of the area in which sub-information is embedded in the image of the printing surface read by the image reading device, and a truth determining section which determines that a printed matter in which a carrier pattern is detected by the first analyzing section and the number of blocks detected by the second analyzing section and having concentration values which lie outside a preset range is smaller than a preset number is true.

27. The truth determination apparatus for the printed matter according to claim 26, further comprising:

a restoring section which restores sub-information based on an image of an area in which sub-information is embedded in an image of a printing surface of a printed matter which is determined to be false by the truth determining section, and a second truth determining section which determines whether the printed matter is true according to whether the sub-information restored by the restoring section is correct.

28. The truth determination apparatus for the printed matter according to claim 26, wherein the carrier pattern is a pattern in which two pixels containing a large amount of certain color components and two pixels containing a large amount of color components which are complementary to the certain color components make pairs.

29. The truth determination apparatus for the printed matter according to claim 26, wherein the preset range is a range between a preset minimum value which is set based on a minimum value of color concentration used to print the synthesized image information and a color-difference amount used to embed the sub-information and a preset maximum value which is set based on a maximum value of color concentration used to print the synthesized image information and a color-difference amount used to embed the sub-information.

30. A truth determination method for a printed matter which determines the truth of the printed matter, comprising:

reading an image of a printing surface of a printed matter, detecting a carrier pattern formed of print pixels in which color components set in a complementary relation make pair from an image of an area in which sub-information is embedded in the read image of the printing surface, detecting a block formed of a plurality of print pixels having concentration values which lie outside a preset range from the image of the area in which sub-information is embedded in the read image of the printing surface, and determining that a printed matter in which the carrier pattern is detected and the number of detected blocks having concentration values which lie outside a preset range is smaller than a preset number is true.

31. The truth determination method for the printed matter according to claim 30, further comprising:
   restoring sub-information based on an image of an area in which sub-information is embedded in an image of a printing surface of a printed matter which is determined to be false by the determining process, and
   determining whether the printed matter is true according to whether the sub-information restored by the restoring process is correct.

32. The truth determination method for the printed matter according to claim 30, wherein the carrier pattern is a pattern in which two pixels containing a large amount of certain color components and two pixels containing a large amount of color components which are complementary to the certain color components make pairs.

33. The truth determination method for the printed matter according to claim 30, wherein the preset range is a range between a preset minimum value which is set based on a minimum value of color concentration used to print the synthesized image information and a color-difference amount used to embed the sub-information and a preset maximum value which is set based on a maximum value of color concentration used to print the synthesized image information and a color-difference amount used to embed the sub-information.

* * * * *